United States Patent
Son et al.

(10) Patent No.: US 10,262,204 B2
(45) Date of Patent: Apr. 16, 2019

(54) USER TERMINAL APPARATUS AND IRIS RECOGNITION METHOD THEREOF

(71) Applicant: Samsung Electronics Co., Ltd., Suwon-si, Gyeonggi-do (KR)

(72) Inventors: Byung-jun Son, Seoul (KR); Jin-woo Yoo, Hwaseong-si (KR); Sung-wook Baek, Seoul (KR); Hyun-geun Jo, Seoul (KR); Byeong-hoon Kwak, Uiwang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/896,748

(22) Filed: Feb. 14, 2018

(65) Prior Publication Data

US 2018/0173952 A1 Jun. 21, 2018

Related U.S. Application Data

(63) Continuation of application No. 14/883,084, filed on Oct. 14, 2015, now Pat. No. 9,928,422.

(30) Foreign Application Priority Data

Oct. 15, 2014 (KR) .................. 10-2014-0139306
Jun. 5, 2015 (KR) .................. 10-2015-0080137

(51) Int. Cl.
*G06K 9/00* (2006.01)
*H04N 5/232* (2006.01)

(52) U.S. Cl.
CPC ..... *G06K 9/00617* (2013.01); *G06K 9/00604* (2013.01); *G06K 9/00912* (2013.01); *H04N 5/23229* (2013.01); *H04N 5/23293* (2013.01)

(58) Field of Classification Search
CPC ............. G06K 9/0061; G06K 9/00617; G06K 9/00597; G06K 9/00288
(Continued)

(56) References Cited

U.S. PATENT DOCUMENTS 5,291,560 A 3/1994 Daugman
7,271,839 B2 9/2007 Lee et al.
(Continued)

FOREIGN PATENT DOCUMENTS

CN 103514439 A 1/2014
EP 2 528 015 A1 11/2012
(Continued)

OTHER PUBLICATIONS

Daugman; How Iris Recognition Works; IEEE Transactions on Circuits and Systems for Video Technology; Jan. 2004; pp. 21-30; vol. 14; No. 1.

*Primary Examiner* — Yosef Kassa
(74) *Attorney, Agent, or Firm* — Jefferson IP Law, LLP

(57) ABSTRACT

A user terminal apparatus and an iris recognition method thereof are provided. The user terminal apparatus includes an imaging unit configured to generate an image of a user, a display configured to display the generated image, and a controller configured to detect a user eye from the generated image, control the display to display a guide image in a position of the generated image in which the detected user eye is located, and perform iris recognition in response to a difference between a size of an iris included in the detected user eye and a size of the guide image being within a preset range.

3 Claims, 49 Drawing Sheets

(58) Field of Classification Search
USPC ....... 382/115, 117, 118, 125, 128, 209, 278; 340/5.81, 5.82
See application file for complete search history.

(56) References Cited

U.S. PATENT DOCUMENTS

| | | | |
|---|---|---|---|
| 7,302,087 B2* | 11/2007 | Cho | G06K 9/00597 382/117 |
| 7,320,087 B2 | 1/2008 | Sato et al. | |
| 7,369,759 B2* | 5/2008 | Kusakari | A61B 5/1171 396/18 |
| 7,410,256 B2 | 8/2008 | Meyers | |
| 7,621,636 B2* | 11/2009 | Su | A61B 3/12 351/206 |
| 7,668,829 B2* | 2/2010 | Chu | G11B 27/105 455/412.1 |
| 7,756,301 B2* | 7/2010 | Hamza | G06K 9/00597 382/117 |
| 7,801,335 B2 | 9/2010 | Hanna et al. | |
| 8,098,901 B2* | 1/2012 | Hamza | G06K 9/0061 382/117 |
| 8,235,725 B1 | 8/2012 | Hill | |
| 8,260,008 B2 | 9/2012 | Hanna et al. | |
| 8,320,623 B2 | 11/2012 | Cleveland | |
| 8,391,566 B2* | 3/2013 | Cottard | G06K 9/0061 382/114 |
| 8,459,792 B2 | 6/2013 | Wilson et al. | |
| 8,472,916 B2* | 6/2013 | Coppage | G10L 13/043 455/404.1 |
| 8,489,062 B2* | 7/2013 | Ray | G10L 13/043 455/404.1 |
| 8,538,370 B2* | 9/2013 | Ray | G10L 13/043 455/404.1 |
| 8,542,879 B1 | 9/2013 | Nechyba et al. | |
| 8,690,326 B2 | 4/2014 | Wilson et al. | |
| 8,798,336 B2 | 8/2014 | Nechyba et al. | |
| 8,831,557 B2* | 9/2014 | Jung | H04W 4/02 455/404.2 |
| 8,850,597 B1 | 9/2014 | Gates et al. | |
| 9,087,238 B2 | 7/2015 | Choi et al. | |
| 9,117,109 B2 | 8/2015 | Nechyba et al. | |
| 2002/0130961 A1 | 9/2002 | Lee et al. | |
| 2003/0118212 A1 | 6/2003 | Min et al. | |
| 2006/0029262 A1 | 2/2006 | Fujimatsu et al. | |
| 2006/0120707 A1 | 6/2006 | Kusakari et al. | |
| 2010/0182456 A1 | 7/2010 | Kim et al. | |
| 2010/0208951 A1 | 8/2010 | Williams et al. | |
| 2010/0246903 A1 | 9/2010 | Cottard | |
| 2013/0162798 A1 | 6/2013 | Hanna et al. | |
| 2013/0271726 A1 | 10/2013 | Wilson et al. | |
| 2014/0016837 A1 | 1/2014 | Nechyba et al. | |
| 2014/0307929 A1 | 10/2014 | Nechyba et al. | |

FOREIGN PATENT DOCUMENTS

| | | |
|---|---|---|
| JP | 2002-342750 A | 11/2002 |
| JP | 2003-108983 A | 4/2003 |
| JP | 2009-080706 A | 4/2009 |
| KR | 10-0464081 B1 | 12/2004 |
| KR | 10-0634666 B1 | 10/2006 |
| KR | 10-0673427 B1 | 1/2007 |
| WO | 2011/090225 A1 | 7/2011 |

* cited by examiner

USER TERMINAL APPARATUS AND IRIS RECOGNITION METHOD THEREOF

CROSS-REFERENCE TO RELATED APPLICATION(S)

This application is a continuation application of prior application Ser. No. 14/883,084, filed on Oct. 14, 2015, which claimed priority under 35 U.S.C. § 119(a) of a Korean patent application filed on Oct. 15, 2014 in the Korean Intellectual Property Office and assigned Serial number 10-2014-0139306, and of a Korean patent application filed on Jun. 5, 2015 in the Korean Intellectual Property Office and assigned Serial number 10-2015-0080137, the entire disclosure of each of which is hereby incorporated by reference.

TECHNICAL FIELD

The present disclosure relates to a user terminal apparatus and an iris recognition method thereof. More particularly, the present disclosure relates to a user terminal apparatus which displays a guide image for iris recognition of a user, and an iris recognition method thereof.

BACKGROUND

As personal information and/or content information are stored in personal user terminal apparatuses, demands on security have been increasing. A password input method is used for security of the user terminal apparatus in the related art, but various authentication methods such as fingerprint recognition, voice recognition, or iris recognition have been introduced in recent years.

In user terminal apparatuses of the related art, users try the iris recognition by staring at a mirror type infrared (IR) pass filter called a cold mirror. The positions and sizes of the iris recognizable in the user terminal apparatus are present for iris recognition in the user terminal apparatus. However, the iris recognition is difficult since the user cannot know the positions and sizes of the iris recognizable in the user terminal. For example, it is difficult to determine a distance suitable for iris recognition in the user terminal apparatus equipped with an imaging unit having no autofocus function.

For the iris recognition in the user terminal apparatus, a process for registering a user iris code is necessary. So as to obtain a high-quality iris image in registration of the user iris code, pieces of iris images are acquired and analyzed, and one or more iris images which are determined as the high-quality images from the pieces of iris images are stored in the iris code database. Even in response to the user iris code being stored among the iris images selected from the pieces of acquired iris images, accurate iris recognition is difficult due to a portion of the iris covered with an eyelid or eyebrows.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user terminal apparatus capable of accurately performing iris recognition more conveniently by a user and an iris recognition method thereof.

In accordance with an aspect of the present disclosure, a user terminal apparatus is provided. The user terminal apparatus includes an imaging unit configured to generate an image of a user, a display configured to display the generated image, and a controller configured to detect a user eye from the generated image, control the display to display a guide image in a position of the generated image in which the detected user eye is located, and perform iris recognition in response to a difference between a size of an iris included in the detected user eye and a size of the guide image being within a preset range.

In accordance with another aspect of the present disclosure, a method of a user terminal apparatus recognizing an iris of a user is provided. The method includes generating an image of the user, displaying the generated image, detecting a user eye from the generated image, displaying a guide image in a position of the generated image in which the detected user eye is located, and performing iris recognition in response to a difference between a size of an iris included in the detected user eye and a size of the guide image being within a preset range.

In accordance with another aspect of the present disclosure, a user terminal apparatus is provided. The user terminal apparatus includes a storage unit configured to store a plurality of reference images acquired according to different imaging conditions, an imaging unit configured to generate an image of a user, a display configured to display the generated image, and a controller configured to detect a user eye from the generated image, and perform iris recognition by comparing a reference image having an imaging condition corresponding to the detected user eye from among the plurality of reference images with the detected user eye.

According to the various embodiments of the present disclosure, the user may perform iris recognition more conveniently and accurately.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
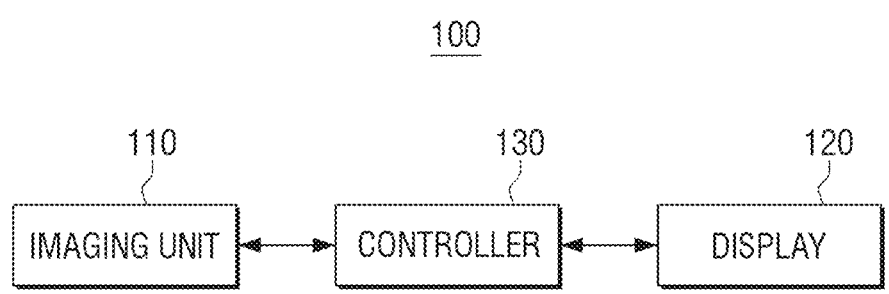
FIG. 1 is a schematic block diagram illustrating a configuration of a user terminal apparatus according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It will be understood that, although the terms first, second, etc. may be used herein in reference to elements of the present disclosure, such elements should not be construed as limited by these terms. The terms are used only to distinguish one element from other elements.

It will be further understood that the terms "comprises," "comprising," "includes," and/or "including," when used herein, specify the presence of stated features, integers, operations, elements, and/or components, but do not preclude the presence or addition of one or more other features, integers, operations, elements, components, and/or groups thereof.

In various embodiments of the present disclosure, "module" or "unit" may perform at least one function or operation, and may be implemented with hardware, software, or a combination thereof. "Plurality of modules" or "plurality of units" may be implemented with at least one processor (not shown) through integration thereof with at least one module other than "module" or "unit" which needs to be implemented with specific hardware.

In various embodiments of the present disclosure, it is assumed that a mobile terminal apparatus and a fixed mobile terminal apparatus such as user equipment (UE), a mobile station (MS) device, or an advanced MS (AMS) device are commonly called a user terminal apparatus.

Hereinafter, the various embodiments of the present disclosure are described in more detail with reference to the accompanying drawings. In the following description, unless otherwise described, the same reference numerals are used for the same elements when they are depicted in different drawings, and overlapping description thereof will be omitted.

Specifically, FIGS. 1 through 29, discussed below, and the various embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the present disclosure. Terms first, second, and the like are used to differentiate between objects having the same terminology and are in no way intended to represent a chronological order, unless where explicitly stated otherwise. A set is defined as a non-empty set including at least one element.

FIG. 1 is a schematic block diagram illustrating a configuration of a user terminal apparatus according to an embodiment of the present disclosure.

Referring to FIG. 1, a user terminal apparatus 100 is illustrated, where the user terminal apparatus 100 may include an imaging unit 110, a display 120, and a controller 130.

The imaging unit 110 may image the user. For example, the imaging unit 110 may image a facial region of the user to recognize an iris of the user.

The display 120 may display an image according to control of the controller 130. For example, the display 120 may display the image imaged through the imaging unit 110. The display 120 may display a guide image for iris recognition in the imaged image.

The controller 130 may control an overall operation of the user terminal apparatus 100. For example, the controller 130 may detect a user eye from the image imaged through the imaging unit 110, control the display 120 to display the guide image in a position of the imaged image in which the detected user eye is located, and perform iris recognition in response to a difference between a size of an iris detected from the user eye and a size of the guide image being within a preset value.

For example, the controller 130 may detect an iris boundary from the detected user eye, estimate an iris diameter based on the detected iris boundary, and control the display 120 to display the guide image in a position corresponding to the user eye and the iris based on the detected user eye and the iris diameter. The guide image may include an eye guide image corresponding to the user eye and an iris guide image corresponding to the user iris. The eye guide image may be displayed in a position corresponding to the user eye, and the iris guide image may be displayed in a position corresponding to the user iris.

In this example, the guide image may be an image corresponding to sizes of the user eye and the iris which are located in a position matching with a focal length of the imaging unit 110. That is, in response to the user being located farther than the focal length of the imaging unit 110, the eye guide image and the iris guide image may be larger than actual user eye and iris. In response to the user being located closer than the focal length of the imaging unit 110, the eye guide image and the iris guide image may be smaller than the actual user eye and iris. Accordingly, the user may perform the iris recognition by controlling a distance to the imaging unit 110 through the guide image.

In another example, the controller 130 may detect the user iris from the imaged image. In response to the difference between the size of the detected user iris and the size of the guide image corresponding to the iris being less than or equal to the preset value, that is, in response to the user being located in an iris-recognizable distance, the controller 130 may perform the iris recognition on the user iris by determining whether or not the detected user iris is consistent with a preregistered iris. In this example, the controller 130 may detect an iris code from the detected user iris and perform user authentication through comparison with the preregistered iris codes.

In another example, the controller 130 may detect the user iris from the imaged image. In response to the difference between the size of the detected user iris and the size of the guide image corresponding to the iris being less than or equal to the preset value, that is, in response to the user being located in an iris-recognizable distance, the controller 130 may output a feedback message for guiding the performing of iris recognition. The feedback message may include at least one of a visual feedback message (for example, an image), an auditory feedback message (for example, an audio signal), and a tactile feedback message (for example, a vibration).

In another example, for the security enhancement during the iris recognition, the controller 130 may process the imaged image so as not to confirm a pattern of the user iris during the performing of the iris recognition, and control the display 120 to display the processed image.

In another example, the controller 130 may generate an iris code by normalizing a detected iris region to a rectangular shape. The controller 130 may perform the iris recognition of the user by masking a region of the iris code normalized in the rectangular shape which is covered with eyebrows or an eyelid, and comparing a remaining region the iris code other than the masked region with a preregistered iris code.

In this example, in response to the detected iris region being recognized as a preregistered user, the controller may update an iris code of the preregistered user using the remaining portion of the detected iris region other than the masked portion.

Through the above-described user terminal apparatus 100, the user may perform user authenticate by performing iris recognition more accurately and conveniently.

Hereinafter, various embodiments of the present disclosure will be described with reference to FIGS. 2 to 7.

Figure 2:
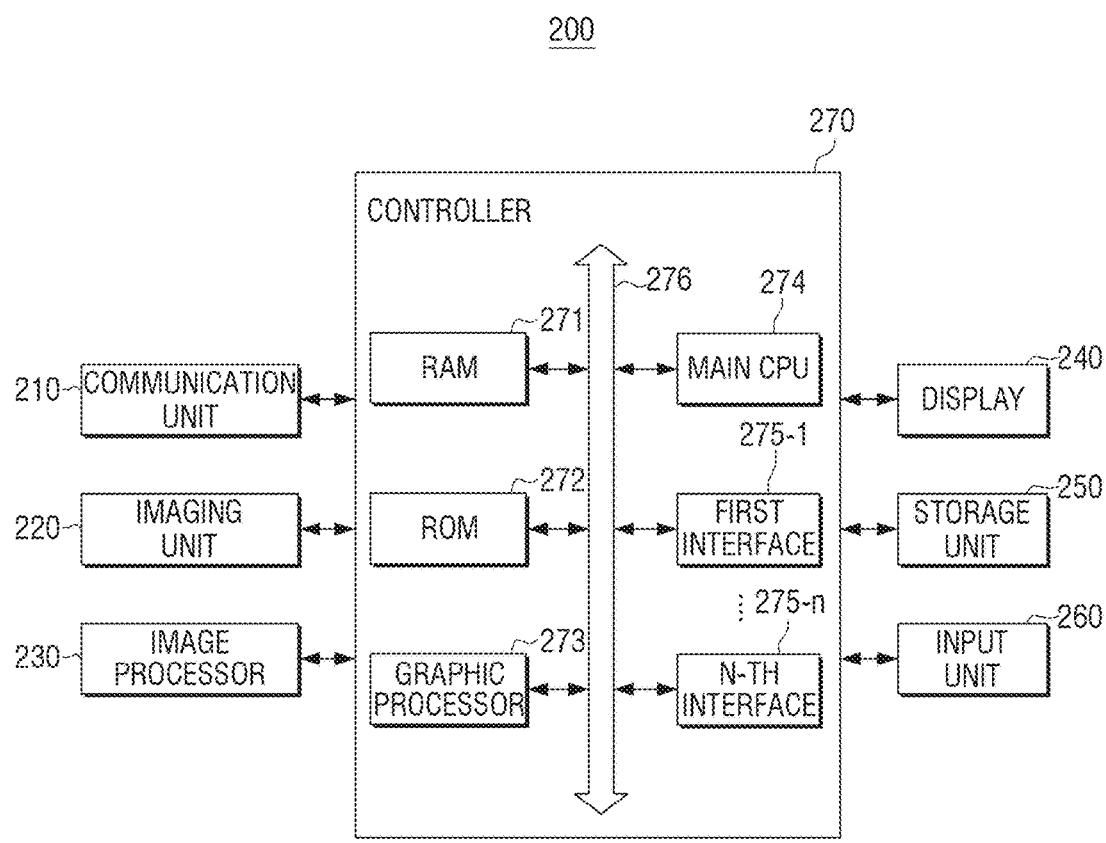
FIG. 2 is a detailed block diagram illustrating a configuration of a user terminal apparatus according to an embodiment of the present disclosure.

FIG. 2 is a detailed block diagram illustrating a configuration of a user terminal apparatus according to an embodiment of the present disclosure.

Referring to in FIG. 2, a user terminal apparatus 200 is illustrated, where the user terminal apparatus 200 may include a communication unit 210, an imaging unit 220, an image processor 230, a display 240, a storage unit 250, an input unit 260, and a controller 270.

The communication unit 210 may be configured to perform communication with various types of external apparatuses according to various types of communication methods. The communication unit 210 may include various communication chips such as a Wi-Fi chip, a Bluetooth chip, a near field communication (NFC) chip, a wireless communication chip, and an infrared (IR) chip. For example, the Wi-Fi chip, the Bluetooth chip, the NFC chip, and the IR chip may perform communication in a Wi-Fi manner, a Bluetooth manner, an NFC manner, and an IR manner, respectively. Among the communication chips, the NFC chip may be a chip configured to operate in an NFC manner using a band of 13.56 MHz among various radio frequency identification (RF-ID) frequency bands such as 135 kHz, 13.56 MHz, 433 MHz, 860 to 960 MHz, and 2.45 GHz.

In response to the Wi-Fi chip or the Bluetooth chip being used, the communication unit 210 may first transmit/receive a variety of connection information such as a service set identifier (SSID) and a session key, perform communication connection using the connection information, and transmit/receive a variety of information. The wireless communication chip may be a chip configured to perform communication according to various communication standards, such as Institute of Electrical and Electronics Engineers (IEEE), ZigBee, 3rd generation (3G), 3G partnership project (3GPP), or long term evolution (LTE).

The imaging unit 220 may perform an imaging operation. The imaging unit 220 may be located in a front of the user terminal apparatus 200 and image the user. The imaging unit 220 may include a mirror type IR pass filter called a cold mirror.

The image processor 230 may process the image imaged by the imaging unit 220. The image processor 230 may perform image processing on the image imaged through the imaging unit 220 to enhance the security.

The display 240 may display images and user interfaces (UIs) input from various sources. The display 240 may display the image imaged through the imaging unit 220, and may display the guide image for iris recognition in a position corresponding to the user eye of the imaged image.

The storage unit 250 may store various modules for driving the user terminal apparatus 200. For example, the storage unit 250 may store software including a base module, a sensing module, a communication module, a presentation module, a web browser module, and a service module.

The base module may refer to a basic module which processes signals transmitted from hardware included in the user terminal apparatus 200 and transmits the processed signals to an upper layer module.

The sensing module may be a module which collects information from various sensors, and analyzes and manages the collected information. The sensing module may include a facial recognition module, a voice recognition module, a motion recognition module, an NFC recognition module, and the like.

The presentation module may be a module which forms a display screen. The presentation module may include a multimedia module which reproduces multimedia content and outputs the reproduced content, and a UI rendering module which performs UI and graphic processing.

The communication module may be a module configured to perform communication with external apparatuses. The web browser module may refer to a module which performs web browsing and accesses a web server. The service module may be a module including various applications for providing a variety of service.

As described above, the storage unit 250 may include various program modules, but the program modules may be partially omitted or deformed according to the kind and characteristic of the user terminal apparatus 200 or another program module may be added according to the kind and characteristic of the user terminal apparatus 200. For example, in response to the user terminal apparatus 200 being implemented with a tablet personal computer (PC), the base module may further include a position determination module configured to determine a global positioning system (GPS)-based position, and the sensing module may further include a sensing module configured to detect the user's action.

The storage unit 250 may store an iris code corresponding to at least one user. The iris code may be data in which the iris region of the user may be normalized in a rectangular shape, and may be used for iris configuration. In response to the iris recognition succeeding, the iris code of the user may be updated in the storage unit 250 through the controller 270.

The input unit 260 may receive various user commands for controlling the user terminal apparatus 200. The input unit 260 may be implemented with a touch screen. The input unit 260 may be implemented with various types of input devices (for example, a remote controller, a keyboard, a mouse, a pointing device, and the like).

The controller 270 may control an overall operation of the user terminal apparatus 200 using a variety of programs stored in the storage unit 250.

As illustrated in FIG. 2, the controller 270 may include a random access memory (RAM) 271, a read only memory (ROM) 272, a graphic processor 273, a main central processing unit (CPU) 274, first to n-th interfaces 275-1 to 275-n, and a bus 276. The RAM 271, the ROM 272, the graphic processor 273, the main CPU 274, the first to n-th interfaces 275-1 to 275-n, and the like may be electrically coupled through the bus 276.

A command set and the like for system booting is stored in the ROM 272. In response to a turn-on command being input to supply power, the main CPU 274 may copy an operating system (O/S) stored in the storage unit 250 to the RAM 271 according to a command stored in the ROM 272, and execute the O/S to boot a system. In response to the booting being completed, the main CPU 274 may copy various application programs stored in the storage unit 250 to the RAM 271, and execute the application programs copied to the RAM 271 to perform various operations.

The graphic processor 273 may be configured to generate a screen including various objects such as an icon, an image, text, and the like using an operation unit (not shown) and a rendering unit (not unit). The operation unit (not shown) may calculate attribute values such as coordinate values, in which the objects are displayed according to a layout of a screen, shapes, sizes, and colors based on a control command input from the input unit 260. The rendering unit (not shown) may generate a screen having various layouts including the objects based on the attribute values calculated in the operation unit. The screen generated in the rendering unit is displayed in a display area of the display 240.

The main CPU 274 accesses the storage unit 250 to perform booting using the O/S stored in the storage unit 250. The main CPU 274 performs various operations using a variety of program, content, data, and the like stored in the storage unit 250.

The first to n-th interfaces 275-1 to 275-n are coupled to the above-described components. One of the interfaces may be a network interface coupled to an external apparatus through a network.

The controller 270 may detect the user eye from the image imaged through the imaging unit 220, and control the display 240 to display the guide image in a position of the imaged image in which the user eye is located.

For example, the controller 270 may detect the user eye from the image imaged through the imaging unit 220 and detect the iris boundary based on the detected eye position.

In this example, the controller 270 may calculate center coordinates (x, y) of the eye from a detected eye region. For example, the controller 270 may calculate center coordinates of a region which is estimated as the eye region as the center coordinates of the eye. In another example, the controller 270 may calculate illumination reflection light (that is, glint) formed in a pupil region of the eye region as the center coordinates of the eye.

The controller 270 may detect the iris boundary by analyzing a change degree of a pixel value based on the eye center point. The change degree of the pixel value may be simply analyzed using a luminance difference between adjacent pixels or may be analyzed using a first-order differential value or a second-order differential value.

As an example of detecting the iris boundary, the controller 270 may perform searching for a specific direction predetermined to detect the iris boundary based on the eye center coordinates. The controller 270 may use a method of estimating a circle approximate to feature points obtained by analyzing the change degree of the pixel value in the searching process. A portion in which the change degree of the pixel value is abruptly increased or reduced may be determined as a position of the feature point in the method of determining the feature point by analyzing the change degree of the pixel value. As another example of detecting the iris boundary, the controller 270 may detect the iris center and an iris boundary by searching for a circle in which the change degrees in pixel values of the inside and outside of the circle are maximized while changing the center point and a size of the circle based on the eye center coordinates. Even in response to an ellipse being used other than the circle, the controller 270 may detect the iris center and the iris boundary by searching for an ellipse in which the change degrees in pixel values of the inside and outside of the ellipse are maximized while changing the center, a major axis and a minor axis of the ellipse based on the eye center coordinates.

The controller 270 may estimate an iris diameter based on the detected iris boundary.

The controller 270 may control the display 240 to display the guide image in a position corresponding to the user eye and the iris based on recognized user eye and the iris diameter. The guide image may be an image corresponding to sizes of the user eye and the iris which are located in a position matching with the focal length of the imaging unit 220. The guide image may include an eye guide image corresponding to the user eye, an iris guide image corresponding to the user iris, and the like. The eye guide image and the iris guide image may have statistic sizes of the user eye and iris in response to the user being located in the position matching with the focal length of the imaging unit 220.

Figure 3A:
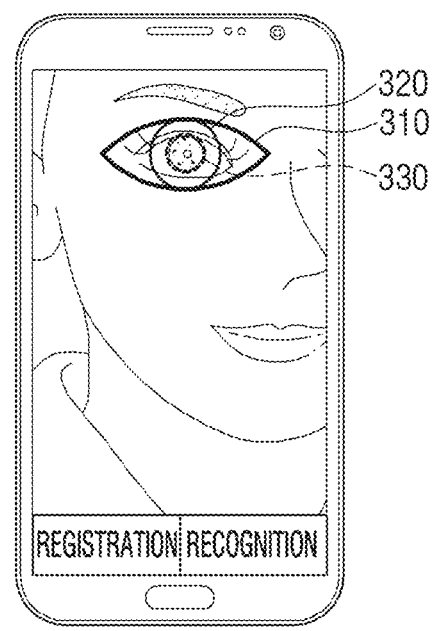
FIGS. 3A and 3B are diagrams illustrating a guide image for iris recognition according to various embodiments of the present disclosure.
Figure 3B:
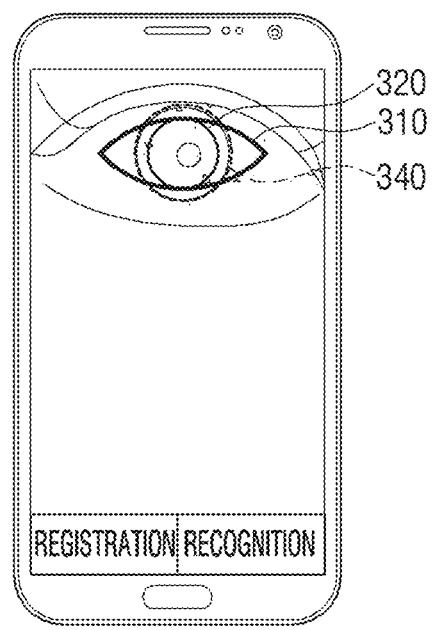

FIGS. 3A and 3B are diagrams illustrating a guide image for iris recognition according to various embodiments of the present disclosure.

Referring to FIG. 3A, an eye guide image 310, an iris guide image 320 and an iris line 330 are illustrated, wherein the controller 270, as illustrated in FIG. 2, may control the display 240, as illustrated in FIG. 2, to display the eye guide image 310 around the detected user eye, and control the display 240 to display the iris guide image 320 around the user iris. The controller 270 may control the display 240 to display the iris line 330 of the user actually detected together with the guide images 310 and 320 so as to confirm a position and distance that the user makes eye contact.

In this example, the user may confirm that the iris line 330 is smaller than the iris guide image 320. Accordingly, the user may confirm that the user is located far from the user terminal apparatus 200 based on the guide images 310 and 320 and the iris line 330, and move the user terminal apparatus 200 to a direction close to the user terminal apparatus 200.

Referring to FIG. 3B, an eye guide image 310, an iris guide image 320 and an iris line 340 are illustrated, wherein the controller 270 may control the display 240 to display the eye guide image 310 around the detected user eye, and control the display 240 to display the iris guide image 320 around the user iris. The controller 270 may control the display 240 to display the iris line 340 of the user actually detected together with the guide images 310 and 320 so as to confirm a position and distance that the user makes eye contact.

In this example, the user may confirm that the iris line 340 is larger than the iris guide image 320. Accordingly, the user may confirm that the user is located close to the user terminal apparatus 200, as illustrated in FIG. 2, based on the guide images 310 and 320 and the iris line 340, and move the user terminal apparatus 200 to a direction far from the user terminal apparatus 200.

However, the iris recognition may not be accurately performed due to the eyelid or eyebrows even in response to the iris region being detected.

Figure 4A:
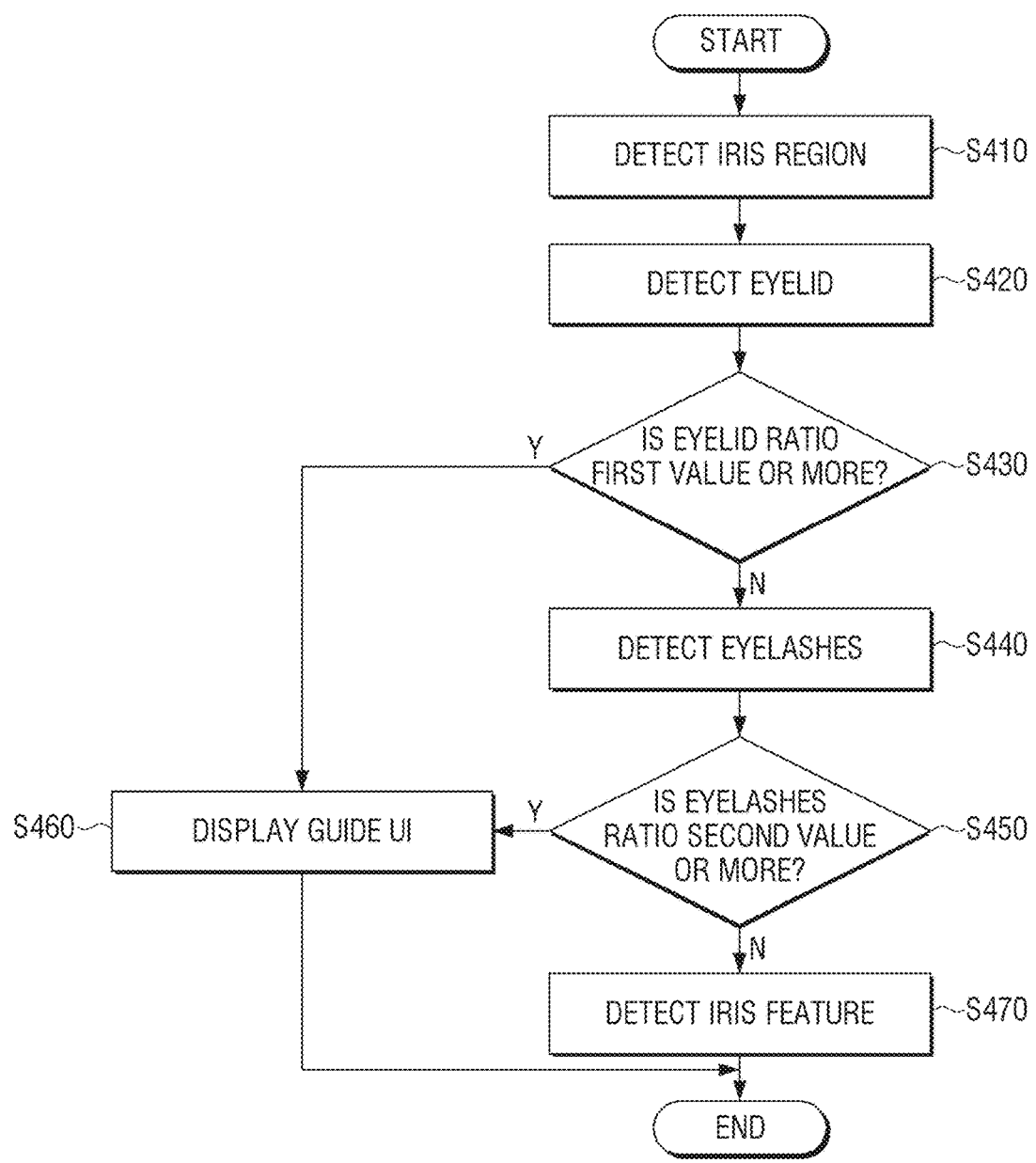
FIGS. 4A, 4B, and 4C are diagrams illustrating a method of extracting an iris feature in consideration of an eye lid and eyebrows according to various embodiments of the present disclosure.
Figure 4B:
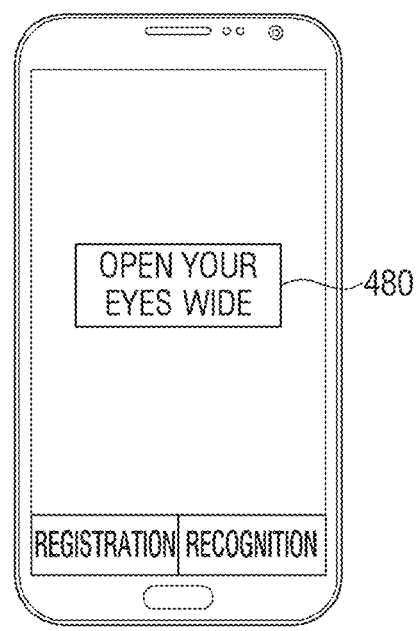
Figure 4C:
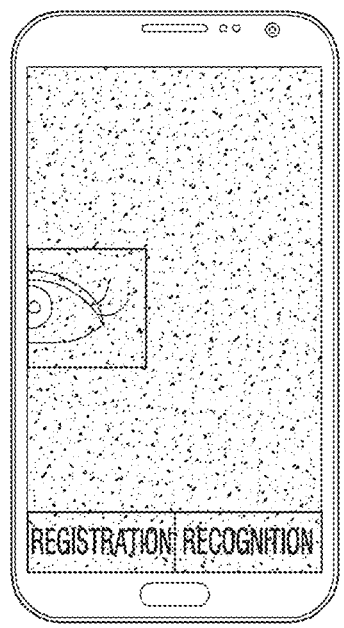

FIGS. 4A, 4B, and 4C are diagrams illustrating a method of extracting an iris feature in consideration of an eye lid and eyebrows according to various embodiments of the present disclosure.

Referring to FIG. 4A a flowchart is illustrated, where the flowchart describes a method of extracting an iris feature in consideration of eyebrows and an eyelid according to an embodiment of the present disclosure.

Referring to FIG. 4A, the controller 270, as illustrated in FIG. 2, may detect an iris region from the detected image at operation S410. The controller 270 may detect an eyelid from the detected image at operation S420. The controller 270 may determine whether or not an eyelid ratio occupied with the eyelid in the iris region is more than or equal to a first value (for example, 5%) at operation S430. In response to the eyelid ratio being less than the first value at operation S430, the controller 270 may detect the eyelashes from the detected image at operation S440. The controller 270 may determine whether or not an eyelashes ratio occupied with the eyelashes in the iris region is more than or equal to a second value at operation S450. In response to the eyelashes ratio being less than the second value at operation S450N), the controller 270 may detect the iris feature for iris recognition at operation S470. That is, the controller 270 may perform the iris recognition only in response to the eyelid ratio and the eyelashes ratio being less than or equal to the preset values.

In response to the eyelid ratio being more than or equal to the first value at operation S430 or in response to the eyelashes ratio being more than or equal to the second value at operation S450, the display 240, as illustrated in FIG. 2, may display a guide UI for smooth iris recognition at operation S460.

Referring to FIG. 4B, a guide UI 480 is illustrated where the display 240, as illustrated in FIG. 2, may display the guide UI 480 including a guidance message "open your eyes wide." That is, in response to the iris recognition being not smoothly performed due to the eyelid or eyebrows of the user who does not open his/her eyes wide, the controller 270, as illustrated in FIG. 2, may display the guide UI 480 for iris recognition.

Referring to FIG. 4C, an illustration is provided such that in response to an iris region of an imaged user being partially imaged, the controller 270, as illustrated in FIG. 2, may not display the guide image for performing the iris recognition.

The security for the iris image as the personal information of the user is very critical. In response to the iris image being intactly displayed, iris information as the personal information of the user may be leaked to the outside through the method of capturing the displayed image or photographing the display image. Accordingly, the controller 270 may control the image processor 230, as illustrated in FIG. 2, to process the imaged image in such a manner that the imaged iris image is not intactly displayed and the user iris information may not be confirmed through various methods, and the controller 270 may control the display 240 to display the processed image through the image processor 230.

Figure 5A:
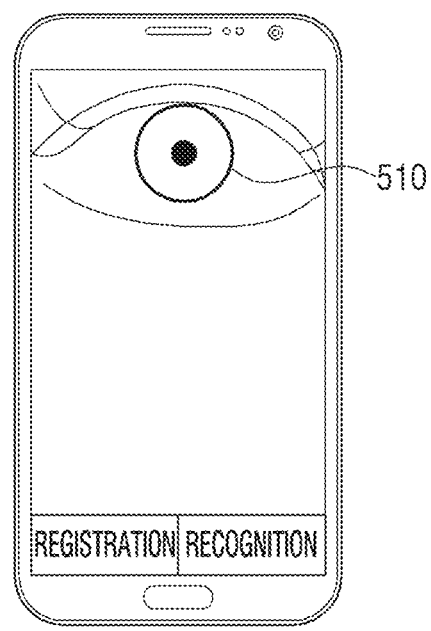
FIGS. 5A, 5B, and 5C are diagrams illustrating a process of performing image processing on an imaged image for security according to various embodiments of the present disclosure.
Figure 5B:
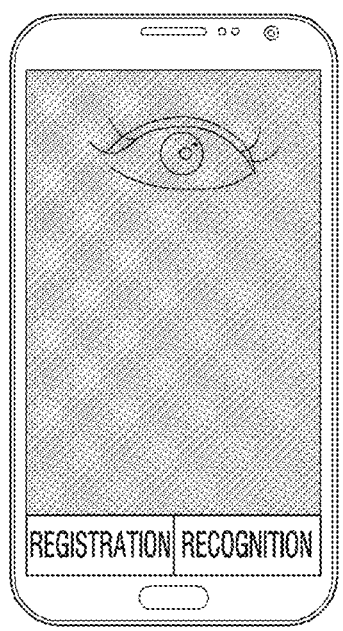
Figure 5C:
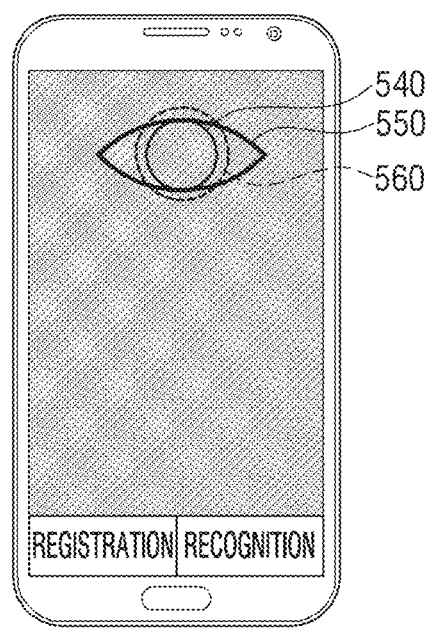

FIGS. 5A, 5B, and 5C are diagrams illustrating a process of performing image processing on an imaged image for security according to various embodiments of the present disclosure.

Referring to FIG. 5A, a virtual iris image 510 is illustrated, where the controller 270, as illustrated in FIG. 2, may control the image processor 230, as illustrated in FIG. 2, and the display 240, as illustrated in FIG. 2, to intactly display the remaining portion of the imaged image other than the iris region and display the virtual iris image 510 in the iris region.

Referring to FIG. 5B, an illustration is provided where the controller 270, as illustrated in FIG. 2, may detect an eye region and an iris region, and control the image processor 230, as illustrated in FIG. 2, and the display 240, as illustrated in FIG. 2, to display the detected eye region and iris region as edge information, and to display the remaining region with a black and white image.

Referring to FIG. 5C, guide images 540 and 550 and an iris line 560 are illustrated, where the controller 270, as illustrated in FIG. 2, may control the image processor 230 and the display 240 not to intactly display the imaged image, and to display only the iris line 560 corresponding to the actual iris region of the user together with the guide images 540 and 550. In this example, the guide images 540 and 550 may be displayed in a solid line and the iris line 560 may be displayed in a dotted line as illustrated in FIG. 5C.

In response to the iris image indicating a current iris size being represented, frame per second (FPS) may be reduced according to the performance of the user terminal apparatus 200, as illustrated in FIG. 2. The abrupt change such as sharp increase or sharp reduction in the iris image indicating the current iris size of the user according to the movement of the user terminal apparatus 200 may occur. To alleviate the phenomenon, an iris size of a current frame may be determined based on the following Equation 1 by reflecting information for an iris size of a previous frame.

$$\text{Iris}_{Diameter_F} = a*\text{Iris}_{Diameter_C} + (1-a)*\text{Iris}_{Diameter_P} \quad 1$$

Here, $\text{Iris\_Diameter}_F$ is a diameter of an iris image, $\text{Iris\_Diameter}_C$ is a diameter of the iris estimated in a current frame, and $\text{Iris\_Diameter}_P$ is a diameter of the iris estimated in a previous frame. a is a weight allocated to the current frame and has a value between 0 (zero) and 1.

The embodiment of the present disclosure has illustrated that the guide image is a circle or an ellipse. The guide image may be represented with various figures such as a quadrangle or a triangle.

In response to the user being located in a focal position of the imaging unit 220 suitable for performing of the iris recognition, that is, the difference between the size of the detected user iris and the size of the iris guide image being less than or equal to a preset value, the controller 270 may output a feedback image for guiding the performing of the iris recognition. For example, in response to the difference between the size of the detected user iris and the size of the iris guide image being within 2% of the iris size of the user, the controller 270 may output the feedback message for guiding the performing of the iris recognition so as to perform the iris recognition.

For example, the controller 270 may output a visual feedback message. In this example, in response to the difference between the size of the iris guide image 320, as illustrated in FIG. 3A, and the size of the iris line 330, as illustrated in FIG. 3A, being less than or equal to the preset value, the controller 270 may control the display 240 to change a color of the iris line 330 or control the display 240 to cause the iris line 330 to flicker. The controller 270 may control the display 240 to cause the entire screen to flicker or control the display 240 to display a separate UI for guiding the performing of the iris recognition.

In another example, the controller 270 may output an auditory feedback message. In this example, in response to the difference between the size of the iris guide image 320 and the size of the iris line 330 being less than or equal to the preset value, the controller 270 may output an alarm sound or output an auditory UI (AUI) for guiding the performing of the iris recognition.

In another example, the controller 270 may output a tactile feedback message such as vibration.

In response to the user being located in a focal position of the imaging unit 220, as illustrated in FIG. 2, suitable for performing of the iris recognition, that is, the difference between the size of the detected user iris and the size of the iris guide image being less than or equal to a preset value, the controller 270 may perform the iris recognition by determining whether or not the detected user iris is consistent with the iris preregistered in the storage unit 250.

Figure 6A:
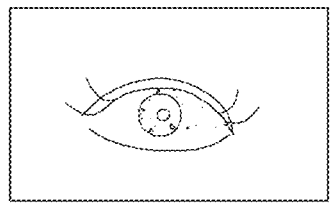
FIGS. 6A and 6B are diagrams illustrating examples in which an iris is covered with eyebrows or an eyelid according to various embodiments of the present disclosure.
Figure 6B:
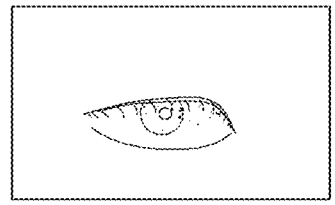

FIGS. 6A and 6B are diagrams illustrating examples in which an iris is covered with eyebrows or an eyelid according to various embodiments of the present disclosure.

In the performing of the iris recognition through the controller 270, as illustrated in FIG. 2, the iris may be entirely imaged as illustrated in FIG. 6A or the portion of the iris may be covered with the eyelid or eyebrows as illustrated in FIG. 6B.

Referring to FIG. 6A, an illustration is provided, such that in response to the iris being entirely exposed, the iris recognition may be normally performed. However, referring to FIG. 6B, an illustration is provided, such that in response to the iris being covered with the eyelid or eyebrows, the success of the iris recognition may be degraded due to the eyelid or eyebrows.

Figure 7:
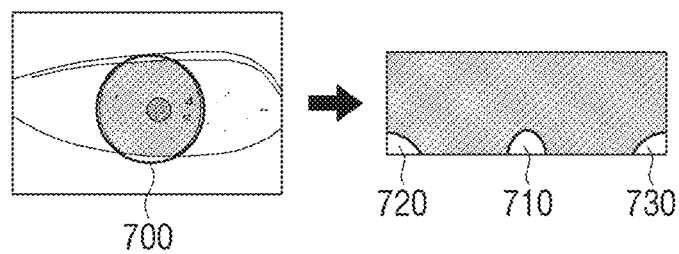
FIG. 7 is a diagram illustrating a method of generating an iris code according to an embodiment of the present disclosure.

To prevent the degradation, the controller 270 may generate an iris code by normalizing a detected iris region to a rectangular shape as illustrated in FIG. 7.

FIG. 7 is a diagram illustrating a method of generating an iris code according to an embodiment of the present disclosure.

Referring to FIG. 7, regions 710, 720 and 730 and a detected iris region 700 are illustrated, where the controller 270, as illustrated in FIG. 2, may perform masking on the regions 710, 720 and 730 covered with the eyelid or eyebrows of the iris code normalized in the rectangular shape.

Hereinafter, a method of generating an iris code by normalizing an iris region will be described with reference to FIGS. 8A to 10.

FIGS. 8A to 10 are diagrams illustrating methods of normalizing an iris region according to various embodiments of the present disclosure.

Figure 8A:
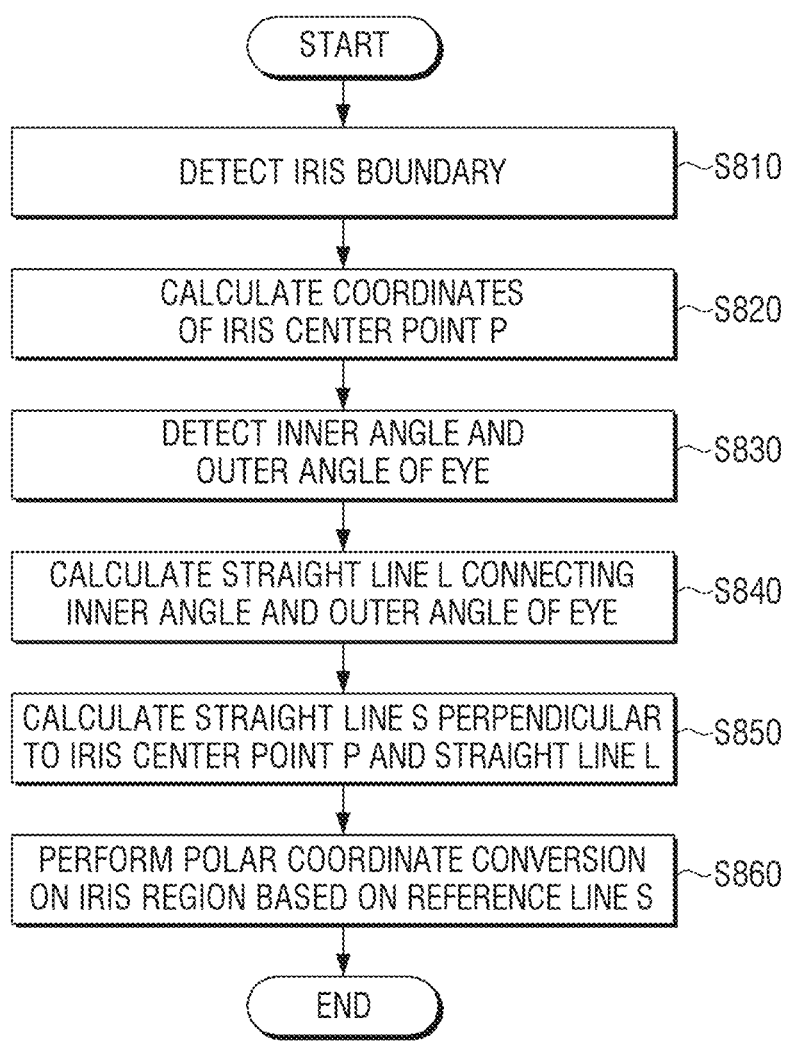
FIGS. 8A, 8B, 9A, 9B, and 10 are diagrams illustrating methods of normalizing an iris region according to various embodiments of the present disclosure.

FIG. 8A is a flowchart illustrating a method of normalizing an iris region by extracting an inner angle of an eye and an outer angle of an eye according to an embodiment of the present disclosure.

Referring to FIG. 8A, a flowchart is illustrated, wherein the controller 270, as illustrated in FIG. 2, may detect an iris boundary from an eye region of an imaged user at operation S810.

The controller 270 may calculate coordinates of an iris center point P at operation S820.

Figure 8B:
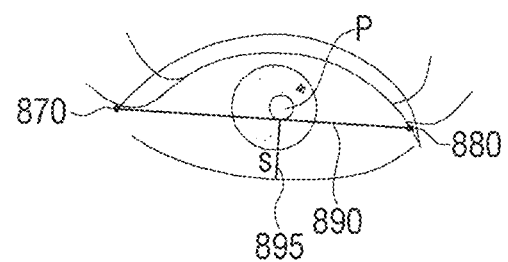

Referring to FIGS. 8A and 8B, the controller 270 may detect an inner angle of an eye 880 and an outer angle of an eye 870 at operation S830.

The controller 270 may calculate a straight line L 890 which connects the inner angle of an eye 880 and the outer angle of eye 870 as illustrated in FIG. 8B at operation S840.

The controller 270 may calculate a straight line S 895 perpendicular to the iris center point P and the straight line L at operation S850.

The controller 270 may perform normalization by performing polar coordinate conversion on the iris region based on the reference line S at operation S860.

Figure 9A:
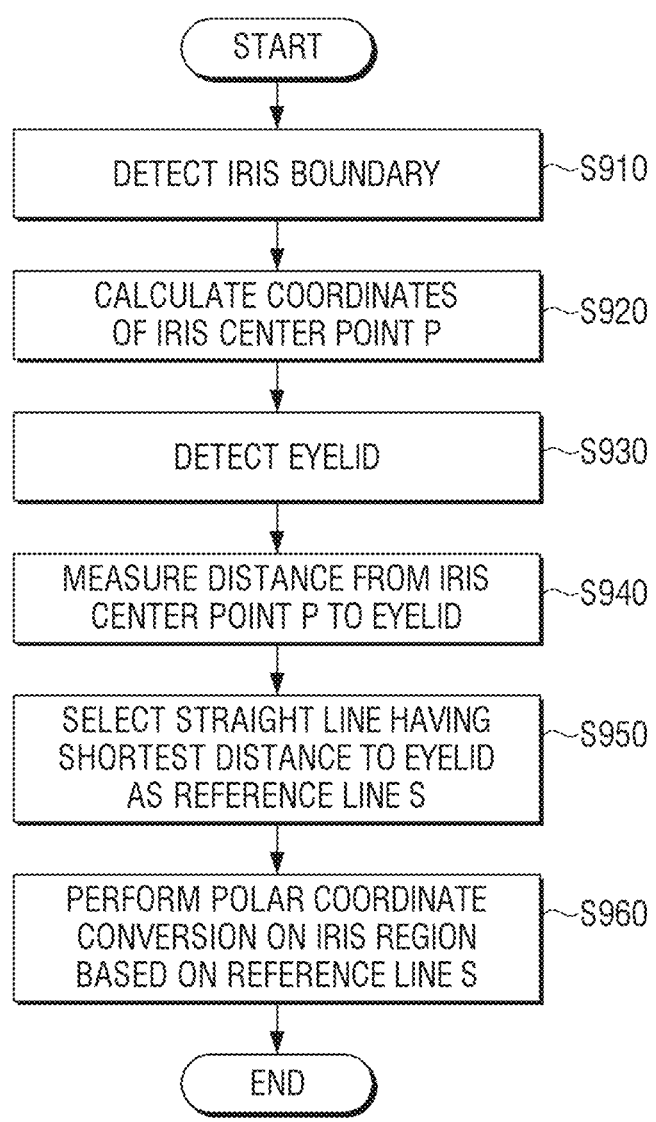

FIG. 9A is a flowchart illustrating a method of normalizing an iris region by extracting an eyelid outline according to an embodiment of the present disclosure.

Referring to FIG. 9A, a flowchart is illustrated, wherein the controller 270, as illustrated in FIG. 2, may detect an iris boundary from an eye region of the imaged user at operation S910. The controller 270 may calculate coordinates of an iris center point P at operation S920.

Figure 9B:
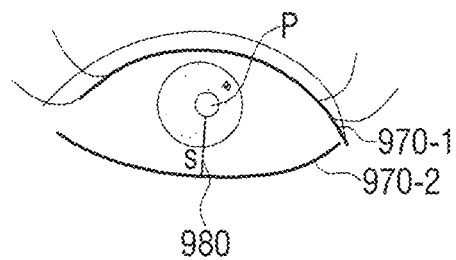

Referring to FIGS. 9A and 9B, the controller 270 may detect outlines 970-1 and 970-2 of an eyelid at operation S930.

The controller 270 may measure a distance from the iris center point P to the eyelid at operation S940.

The controller 270 may select a straight line having the shortest distance from the iris center point P to the eyelid as a reference line S980 at operation S950.

The controller 270 may perform normalization by performing polar coordinate conversion on the iris region based on the reference line S980 at operation S960.

Figure 10:
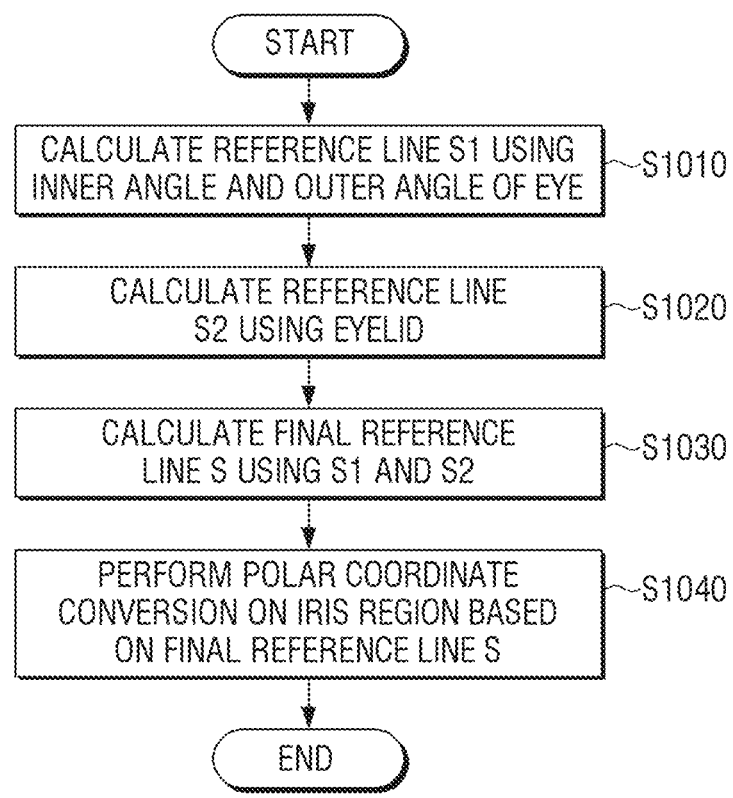

FIG. 10 is a flowchart illustrating a method of normalizing an iris region using both the reference lines detected in FIGS. 8A and 9A according to an embodiment of the present disclosure.

Referring to FIG. 10, a flowchart is illustrated, wherein the controller 270, as illustrated in FIG. 2, may calculate a reference line S1 using an inner angle of an eye and an outer angle of an eye as described in FIG. 8A at operation S1010.

The controller 270 may calculate a reference line S2 using an eyelid as described in FIG. 9A at operation S1020.

The controller 270 may calculate a final reference line S using the reference line S1 and the reference line S2 at operation S1030. For example, the controller 270 may calculate the final reference line S using an average of the reference lines S1 and S2 or the controller 270 may calculate the final reference line S by allocating a weight to specific one of the reference lines S1 and S2.

The controller 270 may perform normalization by performing polar coordinate conversion on the iris region based on the final reference line S at operation S1040.

Referring back to FIG. 7, the controller 270, as illustrated in FIG. 2, may record a matching score by comparing the remaining region of the normalized iris code other than masked regions 710, 720, and 730 with a preregistered iris code, and perform the iris recognition of the user by determining whether or not a preregistered iris code having a matching score more than or equal to a preset value (for example, 97%) is presented. In response to the preregistered iris code having the matching score more than or equal to the preset value being presented, the controller 270 may authenticate the user imaged through the imaging unit 220, as illustrated in FIG. 2, as a user corresponding to the preregistered iris code having the matching score more than or equal to the preset value. For example, in response to the matching score being 98% as a result of comparison of the remaining region other than the masked region with an iris code of a preregistered first user, the matching score being 33% as a result of comparison of the remaining region other than the masked region with an iris code of a preregistered second user, and the matching score being 17% as a result of comparison of the remaining region other than the masked region with an iris code of a preregistered third user, the controller 270 may authenticate the imaged user as the first user as a iris recognition result.

Figure 11:
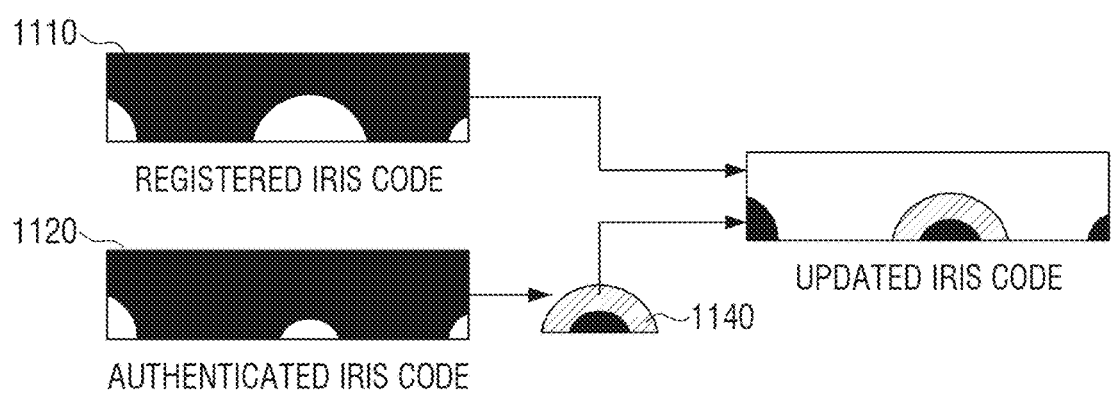
FIG. 11 is a diagram illustrating a method of updating an iris code according to an embodiment of the present disclosure.

FIG. 11 is a diagram illustrating a method of updating an iris code according to an embodiment of the present disclosure.

In response to the iris recognition succeeding, the controller 270, as illustrated in FIG. 2, may analyze a masked region of the preregistered iris code and the masked region of the iris code used in the authentication. In the analysis process, in response to the masked portion of the preregistered iris code being not masked in the iris code used in the authentication, the controller 270 may update the masked portion of the preregistered iris code using the information for the remaining region of the iris code used in the authentication other than the masked region.

Referring to FIG. 11, an unmasked region (hatched region) 1140 of an iris code 1120 is illustrated, wherein the iris code 1120 has succeeded in the authentication being presented in the masked region of the preregistered iris code 1110, the controller 270 may update and store the unmasked region 1140 of the iris code succeeded in the authentication.

As described above, the masked region of the iris code registered in the storage unit 250 may be gradually reduced through the repetitive performing of the iris recognition, and the iris code portion matchable in the authentication may be increased. Accordingly, the iris code registered in the storage unit 250 may be updated through the repetitive iris recognition, and reliability of the user may be increased due to the improvement in the iris recognition performance.

Hereinafter, an iris recognition method and an iris code update method of the user terminal apparatus will be described with reference to FIGS. 12 and 13.

Figure 12:
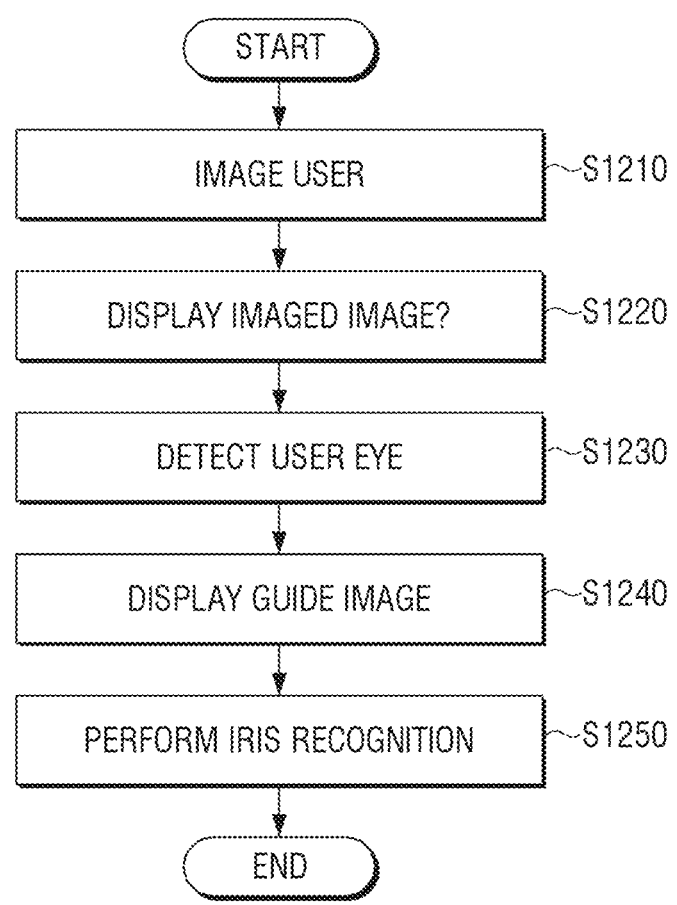
FIG. 12 is a flowchart illustrating an iris recognition method of a user terminal apparatus according to an embodiment of the present disclosure.

FIG. 12 is a flowchart illustrating an iris recognition method of a user terminal apparatus according to an embodiment of the present disclosure.

Referring to FIG. 12, a flowchart is illustrated, in which the user terminal apparatus 200, as illustrated in FIG. 2, may image the user at operation S1210, and display the imaged image at operation S1220.

The user terminal apparatus 200 may detect a user eye from the imaged image at operation S1230. The user terminal apparatus 200 may detect a user iris from the detected user eye.

The user terminal apparatus 200 may display a guide image in a position corresponding to the detected user eye at operation S1240. The user terminal apparatus 200 may display an eye guide image in a position corresponding to the user eye, and display an iris guide image in a position corresponding to the user iris.

The user terminal apparatus 200 may perform iris recognition at operation S1250. In response to the user being located in a distance suitable for iris recognition through an iris guide image, that is, in response to a difference between a size of an iris included in the detected user eye and a size of the guide image being within a preset range, the user terminal apparatus 200 may perform iris recognition.

As described above, through the display of the guide image in the detected eye position, the user may perform the iris recognition more conveniently.

Figure 13:
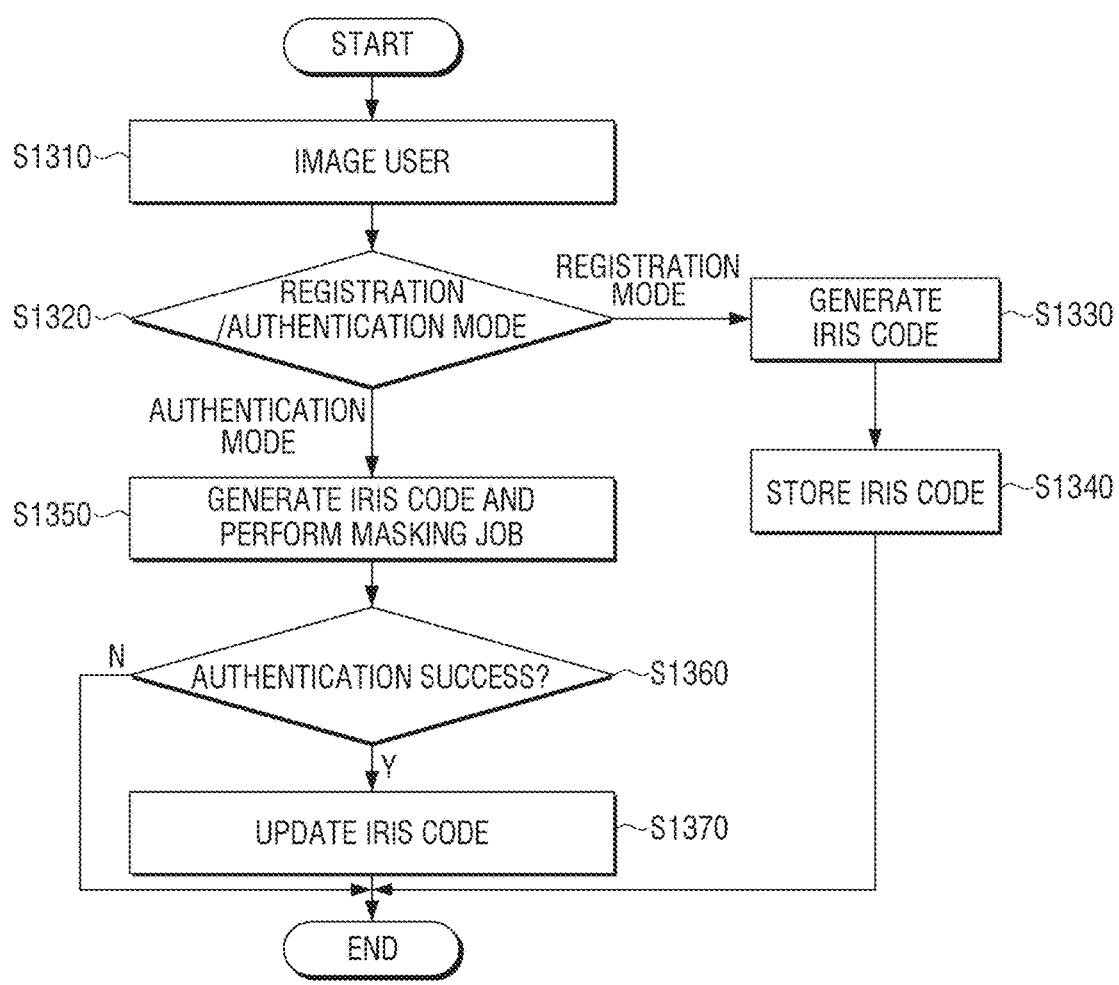
FIG. 13 is a flowchart illustrating a method of storing and updating an iris code of a user terminal apparatus according to an embodiment of the present disclosure.

FIG. 13 is a flowchart illustrating an iris code storing and updating method of a user terminal apparatus according to an embodiment of the present disclosure.

Referring to FIG. 13, a flowchart is illustrated, wherein the user terminal apparatus 200, as illustrated in FIG. 2, may image a user at operation S1310.

The user terminal apparatus 200 may determine whether a current mode is an iris code registration mode or an iris authentication mode at operation S1320.

In the iris code registration mode, the user terminal apparatus 200 may generate an iris code from the imaged image at operation S1330. For example, the user terminal apparatus 200 may detect an iris region from the imaged image, normalize the detected iris region to a rectangular shape, and generate the iris code by masking a region of the normalized iris region such as an eyelid or eyebrows.

The user terminal apparatus 200 may store the generated iris code in a database DB at operation S1340.

In the iris authentication mode, the user terminal apparatus 200 may generate the iris code, and perform a masking job on a portion unnecessary for the authentication such as the eyelid or eyebrows at operation S1350.

The user terminal apparatus 200 may determine whether or not the authentication for the iris code on which the masking job is performed is succeeded at operation S1360. For example, the user terminal apparatus 200 may determine whether or not the authentication has succeeded by comparing an iris code pre-stored in the database DB with the iris code on which the masking job is performed.

In response to the authentication succeeding at operation S1360, the user terminal apparatus 200 may update the preregistered iris code using the iris code used in the authentication at operation S1370. For example, in response to the masked portion of the preregistered iris code being not masked in the iris code used in the authentication, the user terminal apparatus 200 may update the masked portion of the iris code preregistered in the database DB using information the remaining region of the user iris code used the authentication other than the masked region.

In response to the authentication not succeeding at operation S1360, the method ends.

As described above, the preregistered iris code may be updated in the iris recognition success, and thus reliability of the user may be increased due to the improvement in the iris recognition performance.

Hereinafter, an example of switching a screen through iris recognition will be described with reference to FIGS. 14A to 18.

FIGS. 14A to 18 are diagrams illustrating screen switching examples through iris recognition of a user terminal apparatus according to various embodiments of the present disclosure.

The controller 270, as illustrated in FIG. 2, may control the display 240, as illustrated in FIG. 2, to display a fixation UI and a guide image in various screens which require user authentication. In response to the iris recognition being performed through the fixation UI and the guide image, the controller 270 may control the display 240 to switch the screen requiring the user authentication to another screen. The controller 270 may control the display 240 to switch the screen requiring the user authentication to the other screen by enlarging the fixation UI.

Figure 14A:
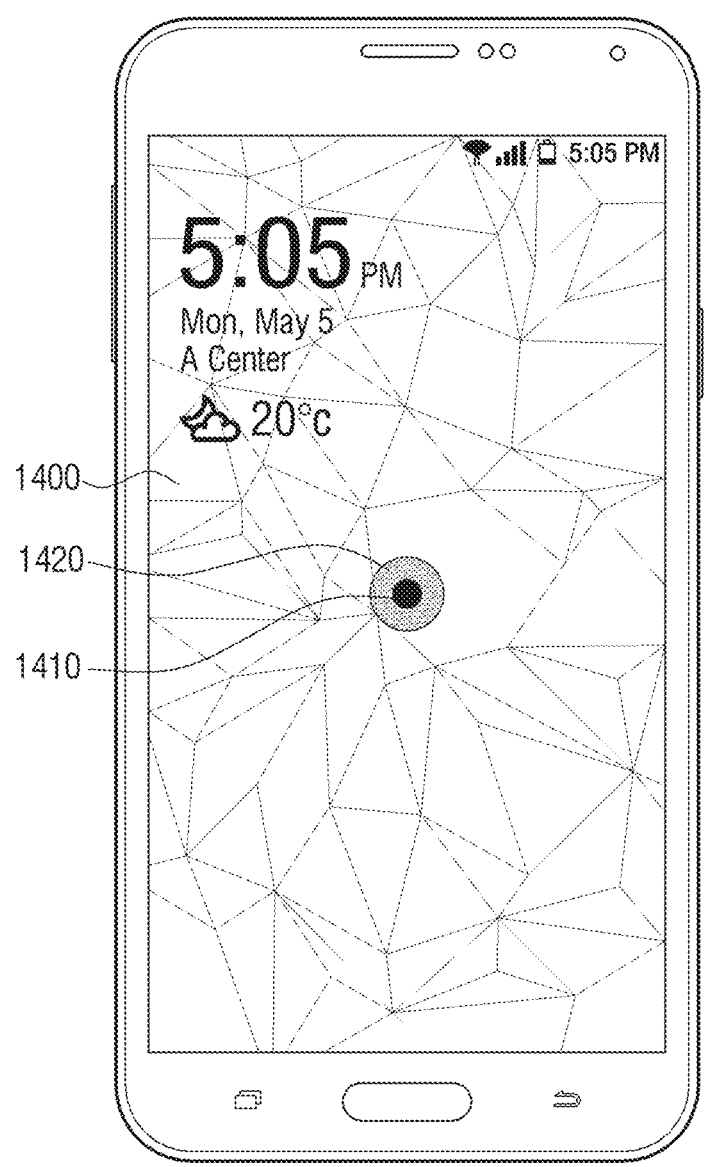
FIGS. 14A, 14B, 14C, 14D, 15A, 15B, 16A, 16B, 17A, 17B, and 18 are diagrams illustrating screen switching examples through iris recognition of a user terminal apparatus according to various embodiments of the present disclosure.

Referring to FIG. 14A, a home screen 1400 is illustrated, wherein the controller 270, as illustrated in FIG. 2, may control the display 240, as illustrated in FIG. 2, to display the home screen 1400.

The home screen 1400 may include a fixation UI 1410 and a guide image 1420. The fixation UI 1410 may be a UI for guiding a point at which the user stares, and the guide image 1420 may be an image for guiding a position and a size of an eye at which the user stares through the relative position and size to the fixation UI 1410.

Figure 15A:
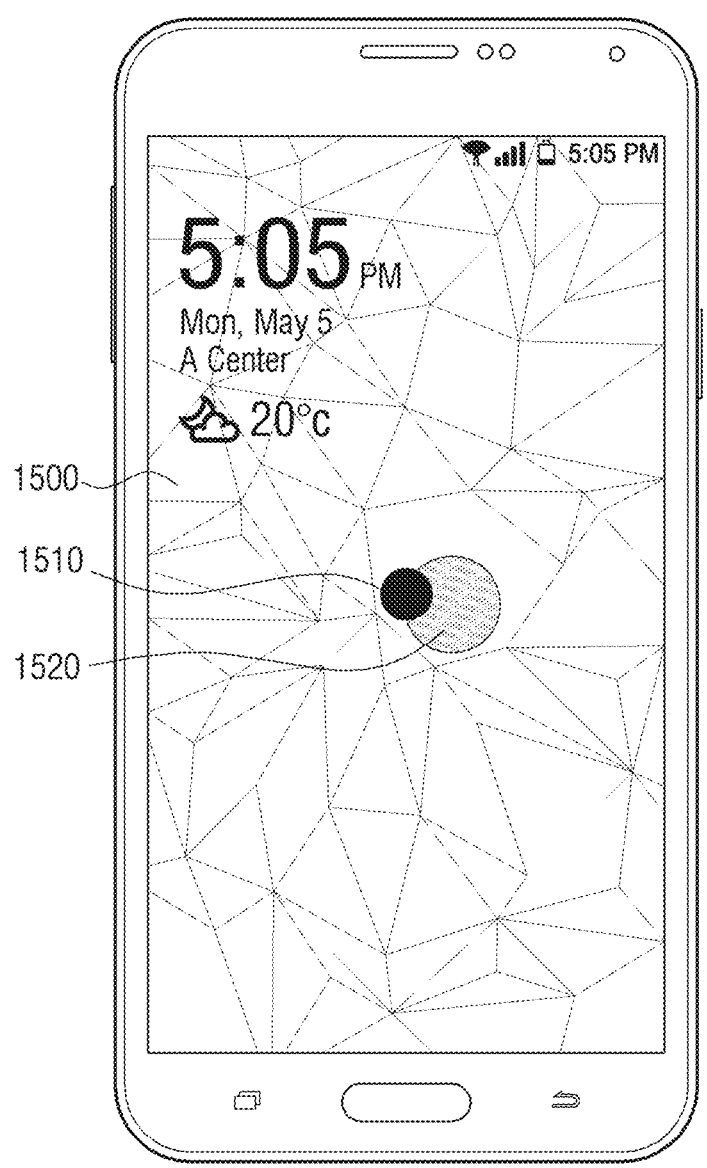
Figure 15B:
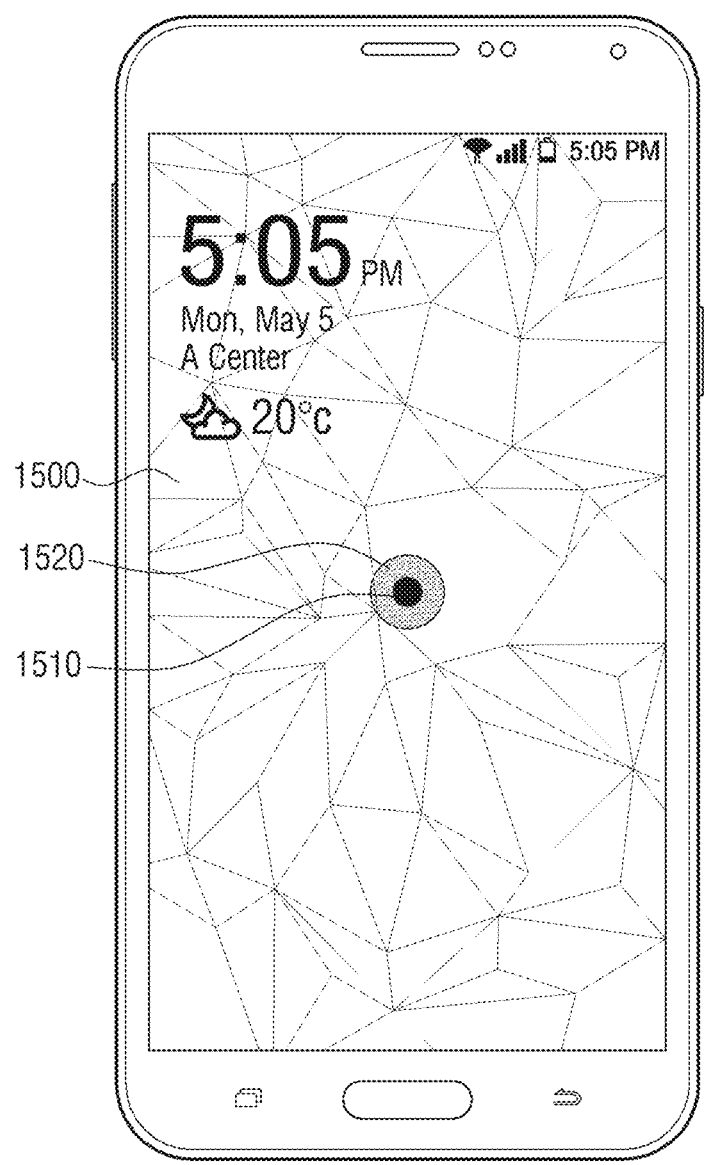

Referring to FIG. 15A, a home screen 1500, a fixation UI 1510 and a guide image 1520 are illustrated, where it can be seen that the guide image 1520 is larger than the fixation UI 1510, and is located in the right of the fixation UI 1510. In this example, the guide image may guide that a face of the user is close to the user terminal apparatus 200, and located to the right of the user terminal apparatus 200. In response to the face of the user being far from the user terminal apparatus 200 and moved to the left of the user terminal apparatus 200, the controller 270 may match sizes of the fixation UI 1510 and the guide image 1520 of the home screen 1500, as illustrated in FIG. 15B.

Figure 14B:
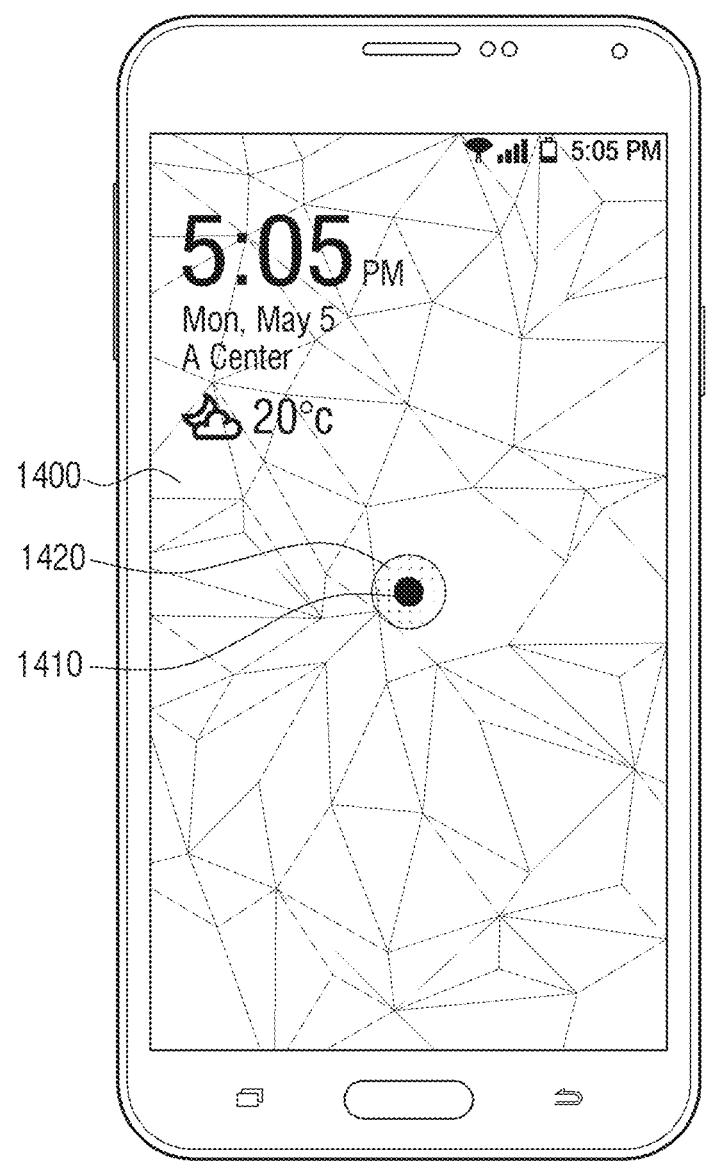

Referring to FIG. 14B, a home screen 1400, a fixation UI 1410 and a guide image 1420 are illustrated, such that in response to the position and size of the fixation UI 1410 corresponding to the position and size of the guide image 1420, the controller 270, as illustrated in FIG. 2, may guide that the iris recognition starts to be performed by changing a type (for example, color, flickering, transparency, and the like) of the guide image 1420.

Figure 14C:
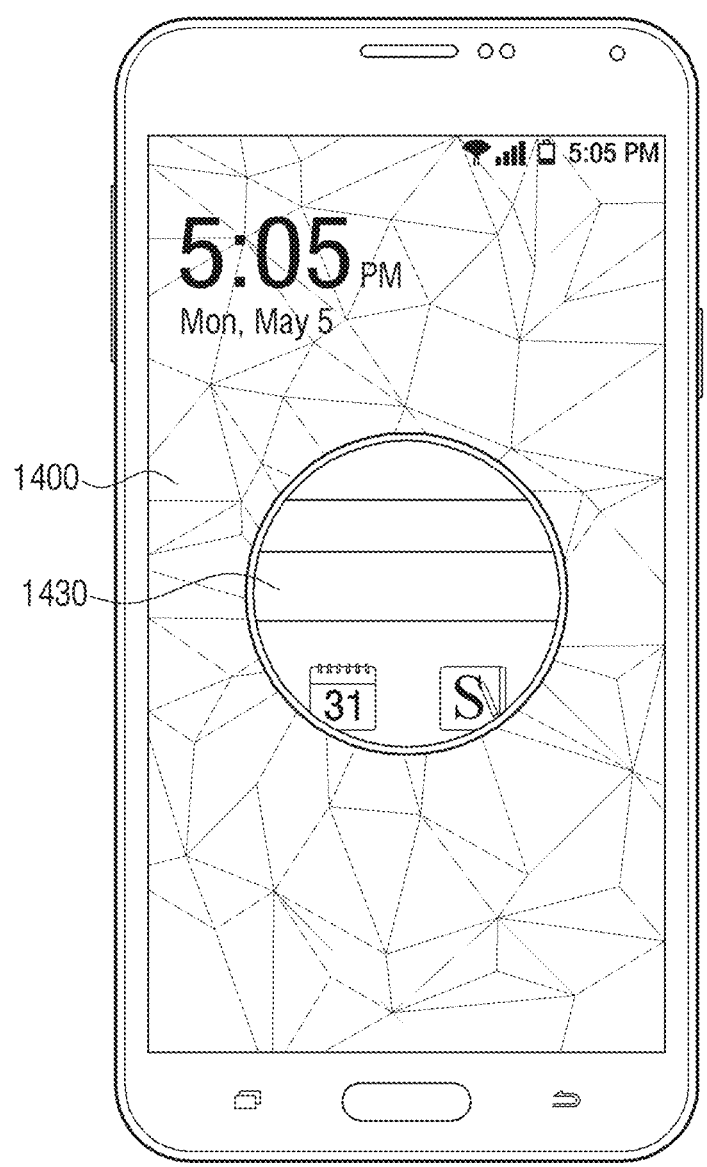

In response to the user authentication being performed through the iris recognition, referring to FIG. 14C, a home screen 1400 is illustrated, such that the controller 270 may control the display 240 to display a portion of a start screen 1430 by gradually enlarging the fixation UI 1410 as illustrated in FIG. 14B.

Figure 14D:
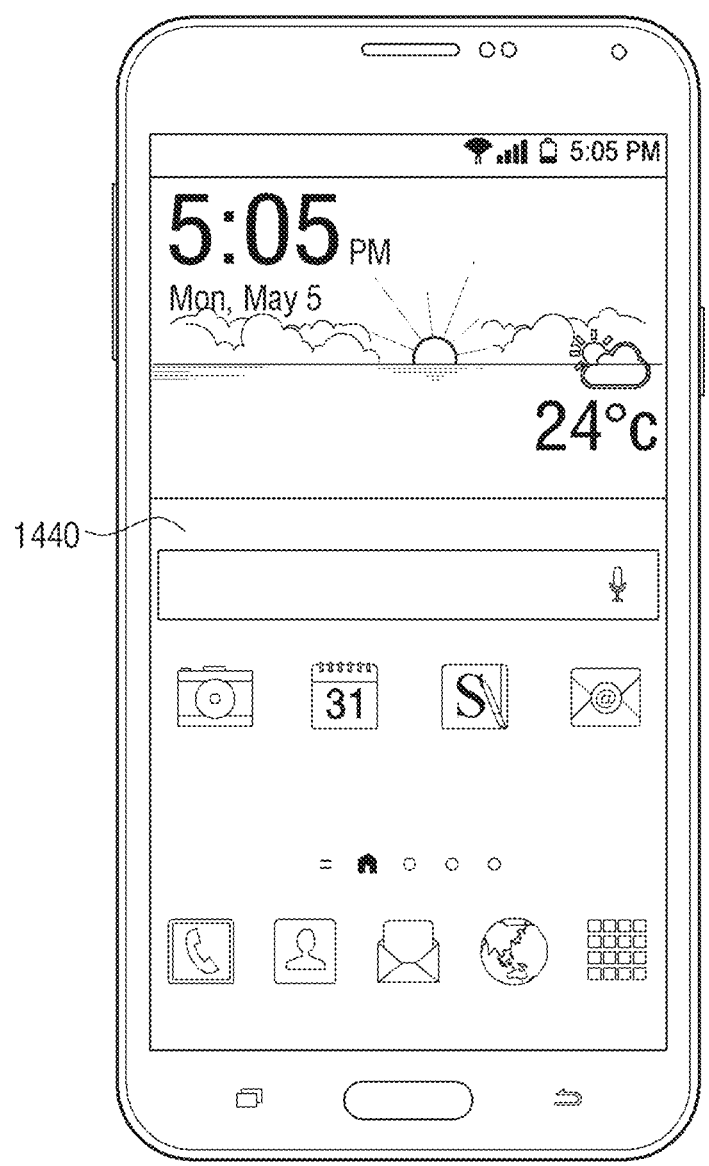

Referring to FIG. 14D, an entire screen 1440 is illustrated, such that the controller 270, as illustrated in FIG. 2, may control the display 240, as illustrated in FIG. 2, to display the start screen as the entire screen 1440 by further enlarging the fixation UI 1410, as illustrated in FIG. 14B.

Figure 16A:
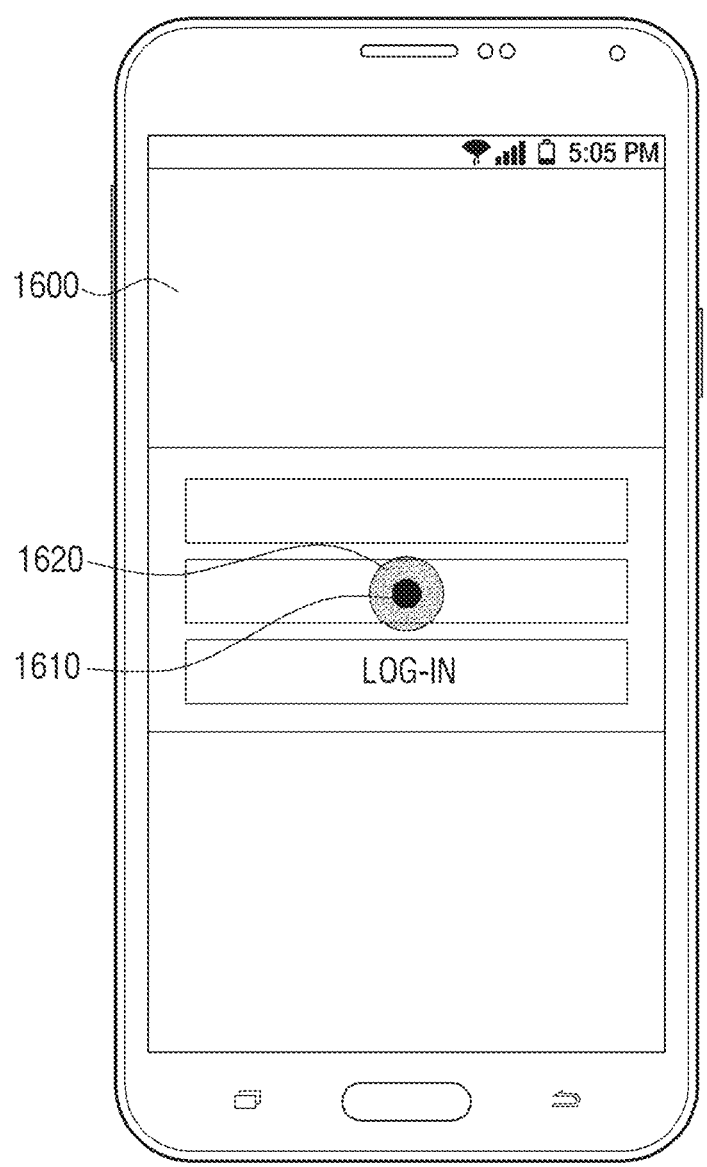

Referring to FIG. 16A, a start screen 1600, a fixation UI 1610 and a guide image 1620 are illustrated, such that the controller 270, as illustrated in FIG. 2, may control the display 240, as illustrated in FIG. 2, to display the fixation UI 1610 and the guide image 1620 in the start screen 1600 of a specific application which needs to log in.

Figure 16B:
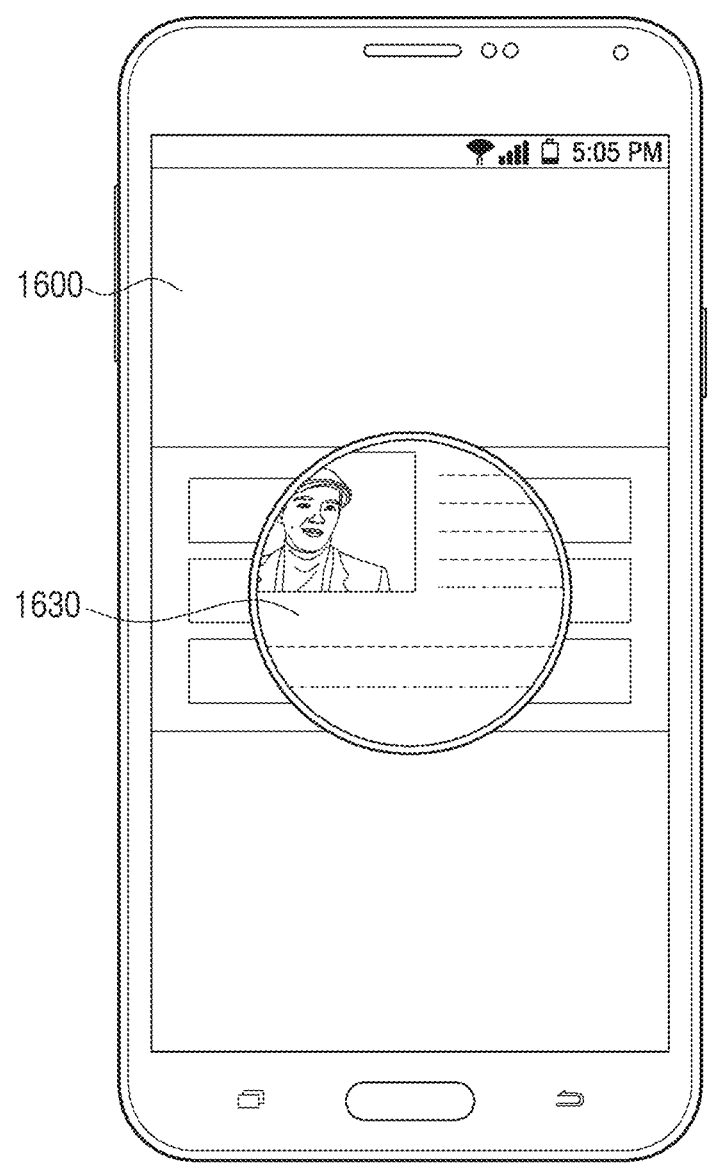

In response to the user authentication succeeding by performing the iris recognition through the fixation UI 1610 and the guide image 1620, referring to FIG. 16B, the controller 270 may control the display 240 to switch the start screen 1600 to a screen 1630 after the log-in of the specific application by enlarging the fixation UI 1610.

Figure 17A:
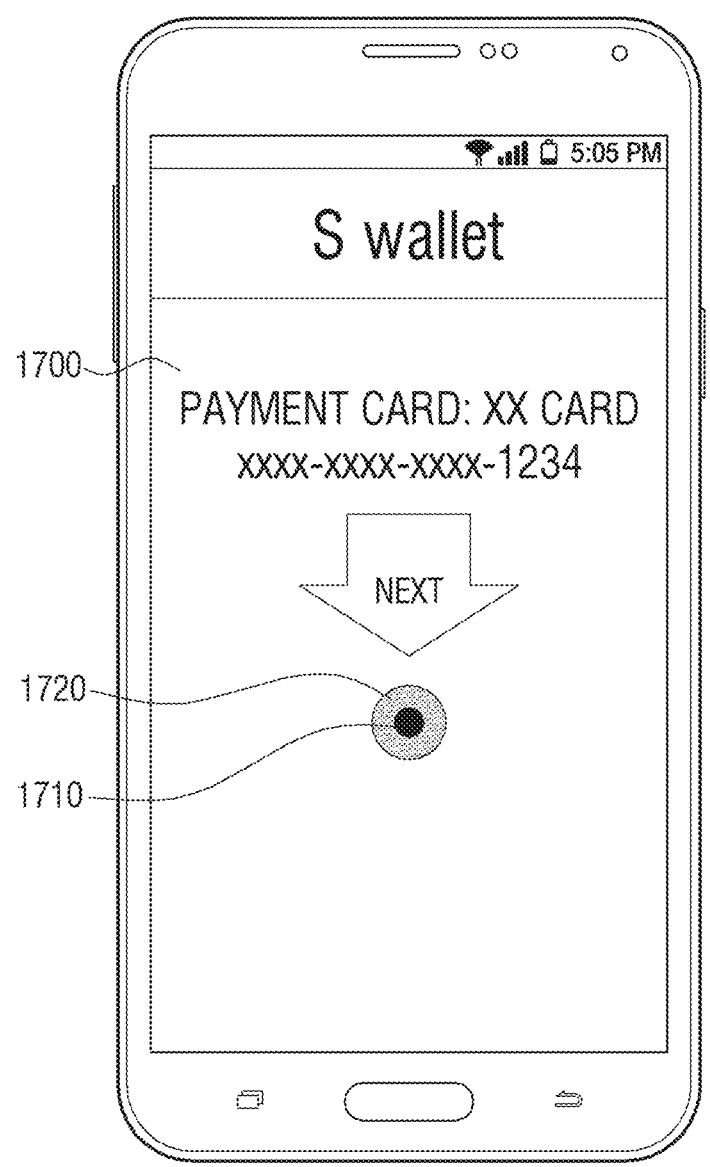
Figure 17B:
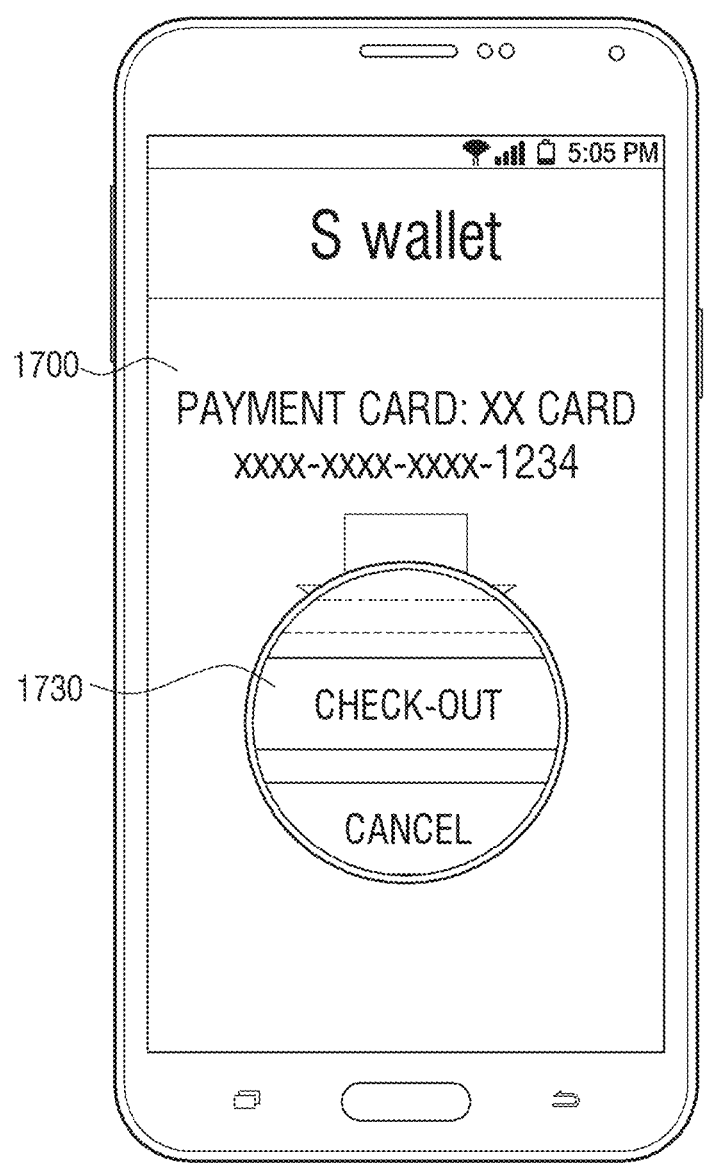

Referring to FIG. 17A, a check-out screen 1700, a fixation UI 1710 and a guide image 1720 are illustrated, such that the controller 270, as illustrated in FIG. 2, may control the display 240, as illustrated in FIG. 2, to display the fixation UI 1710 and the guide image 1720 in the check-out screen 1700. In response to the user authentication succeeding by performing the iris recognition through the fixation UI 1710 and the guide image 1720, referring to FIG. 17B, the controller 270 may control the display 240 to switch the check-out screen 1700 to an authentication success screen 1730 by enlarging the fixation UI 1710.

Figure 18:
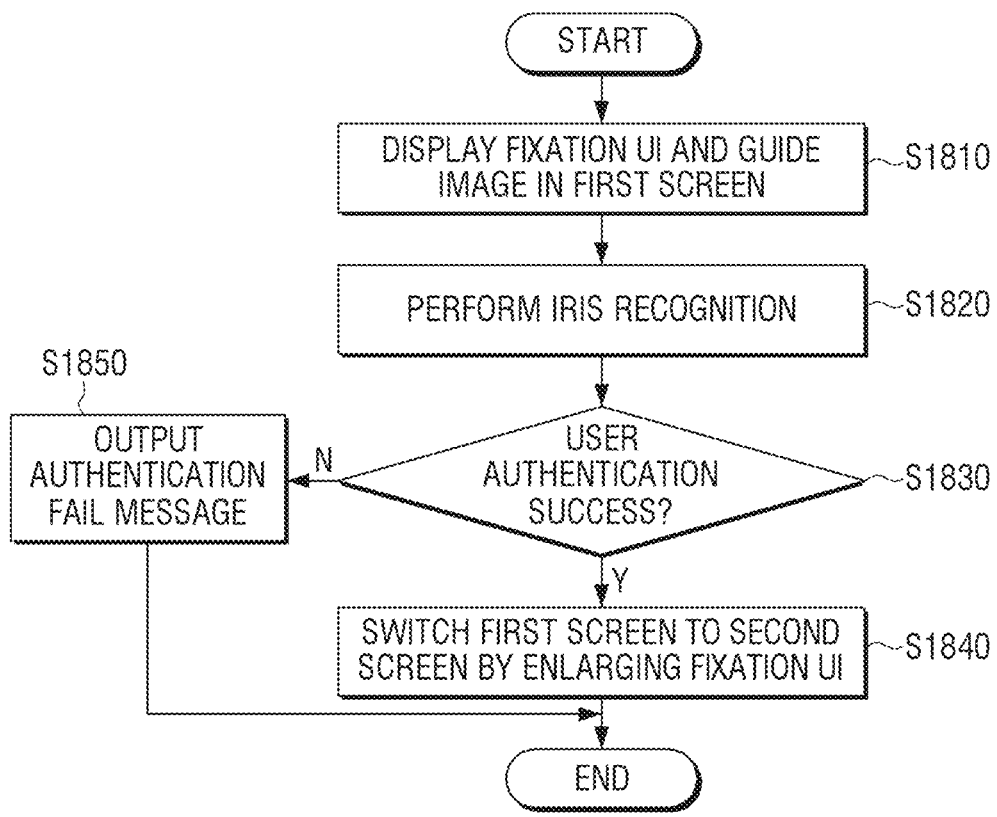

FIG. 18 is a flowchart illustrating an iris recognition method of a user terminal apparatus according to an embodiment of the present disclosure.

Referring to FIG. 18, a flowchart is illustrated, wherein the user terminal apparatus 200, as illustrated in FIG. 2, may display a fixation UI and a guide image in a first screen at operation S1810. The first screen may be a screen which requires user authentication, and may include a home screen, a log-in screen, a check-out screen, and the like. The fixation UI may be a UI for guiding a point at which the user stares. The guide image may be an image for guiding a position and size of an eye at which the user stares through the relative position and size to the fixation UI.

The user terminal apparatus 200 may perform iris recognition using the fixation UI and guide image at operation S1820.

The user terminal apparatus 200 may determine whether or not user authentication using the iris recognition has succeeded at operation S1830.

In response to the user authentication having succeeded at operation S1830, the user terminal apparatus 200 may switch the first screen to a second screen by enlarging the fixation UI at operation S1840. The second screen may be a screen after user authentication, and may include a start screen, a screen after log-in, an authentication success screen, and the like.

In response to the user authentication having failed at operation S1830 the user terminal apparatus 200 may output an authentication fail message at operation S1850.

As described above, the iris recognition may be more conveniently performed through the fixation UI and guide image, and the new user experience switched to another screen through screen fixation may be provided.

Hereinafter, an example for performing iris recognition through a person's eye-shaped fixation UI with reference to FIGS. 19A to 22.

FIGS. 19A to 22 are diagrams illustrating examples of performing iris recognition through an eye-shaped fixation UI according to various embodiments of the present disclosure.

The user has to stare at an eye widely for a long time to increase a success rate of iris recognition. However, this action may be somewhat an unusual action to the user. Therefore, in an embodiment of the present disclosure, the user terminal apparatus 200, as illustrated in FIG. 2, may display an eye-shaped fixation UI, and may allow the user to open his/her eyes wide for a long time by causing the user to have a staring match with a virtual person.

Figure 19A:
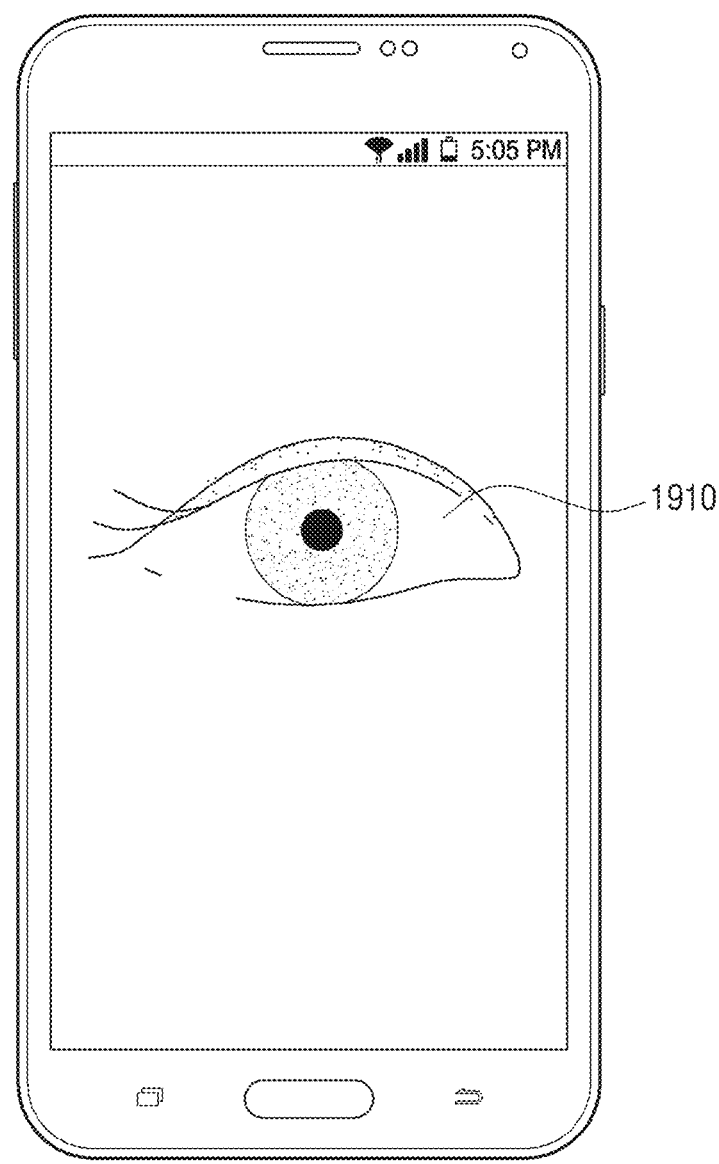
FIGS. 19A, 19B, 19C, 19D, 20A, 20B, 21, and 22 are diagrams illustrating examples of performing iris recognition through an eye-shaped fixation user interface (UI) according to various embodiments of the present disclosure.

Referring to FIG. 19A, an eye-shaped fixation UI 1910 is illustrated, wherein the controller 270, as illustrated in FIG. 2, may control the display 240, as illustrated in FIG. 2, to display the person's eye-shaped fixation UI 1910 in a display screen. The controller 270 may cause the user to have a staring match by repeatedly open a person's eye included in the eye-shaped fixation UI in wide and narrow configurations.

Figure 19B:
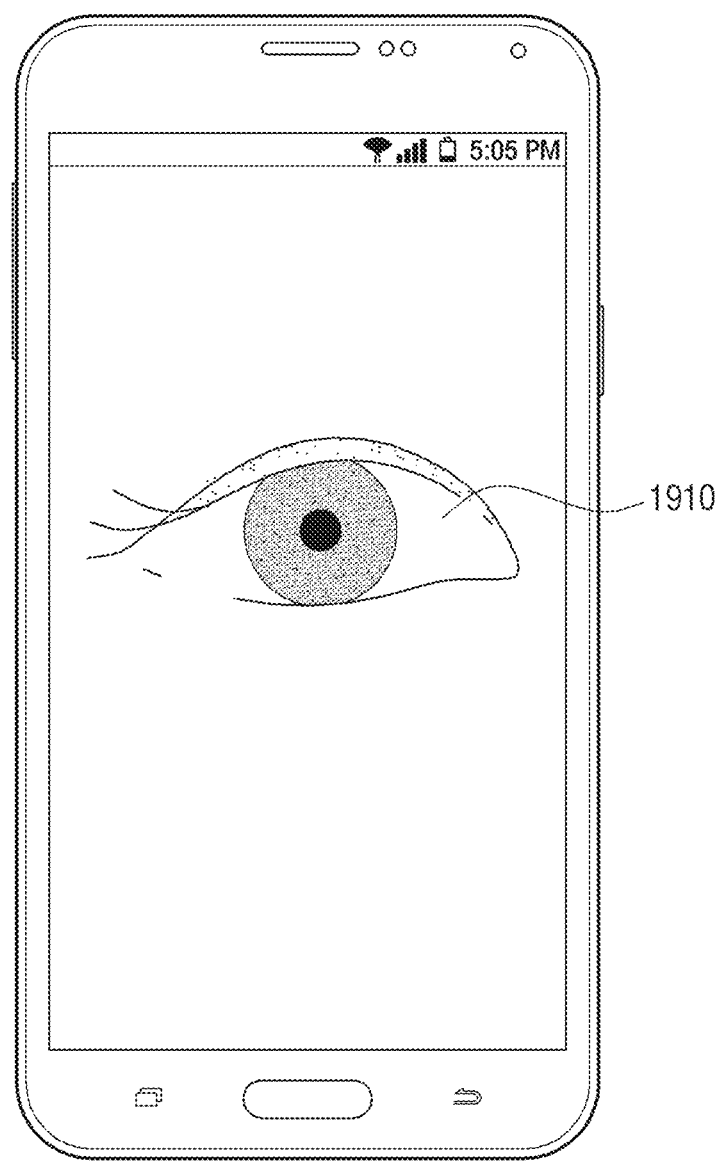
Figure 19C:
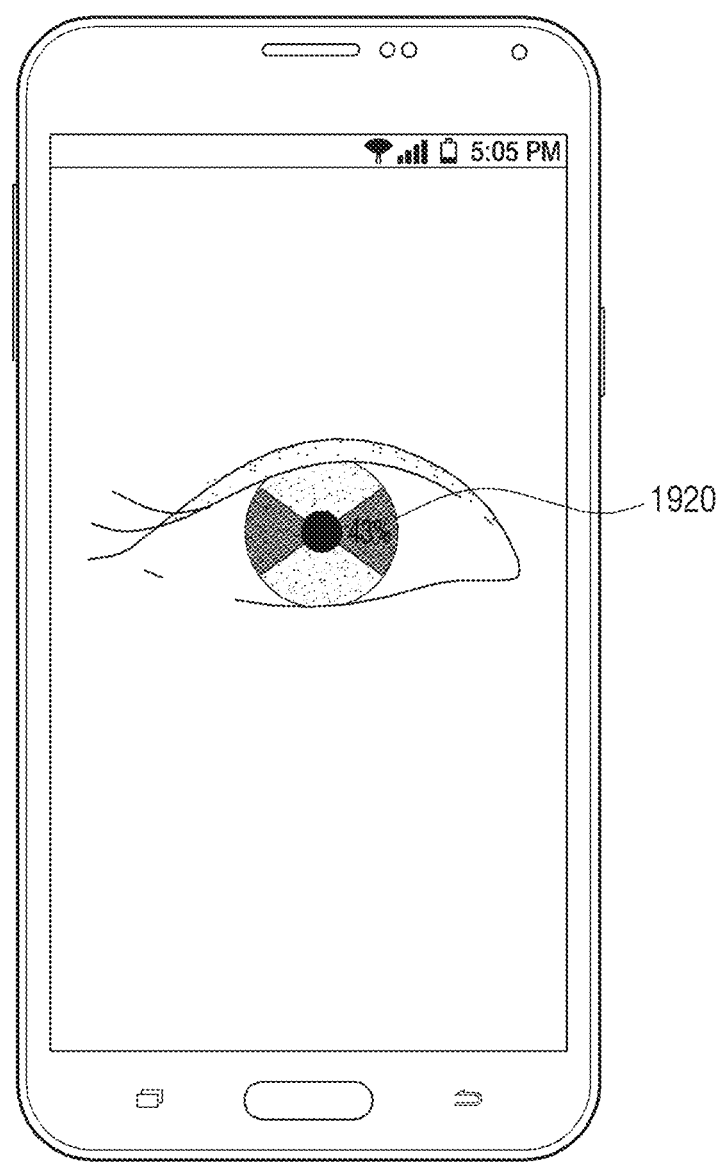

Referring to FIG. 19B, in response to the iris recognition being performed, the controller 270 may change a color of the eye-shaped fixation UI 1910, and referring to FIG. 19C, the controller 270 may control the display 240 to display a UI 1920 for guiding the degree of the iris recognition progress in the eye-shaped fixation UI 1910 as illustrated in FIG. 19C.

Figure 19D:
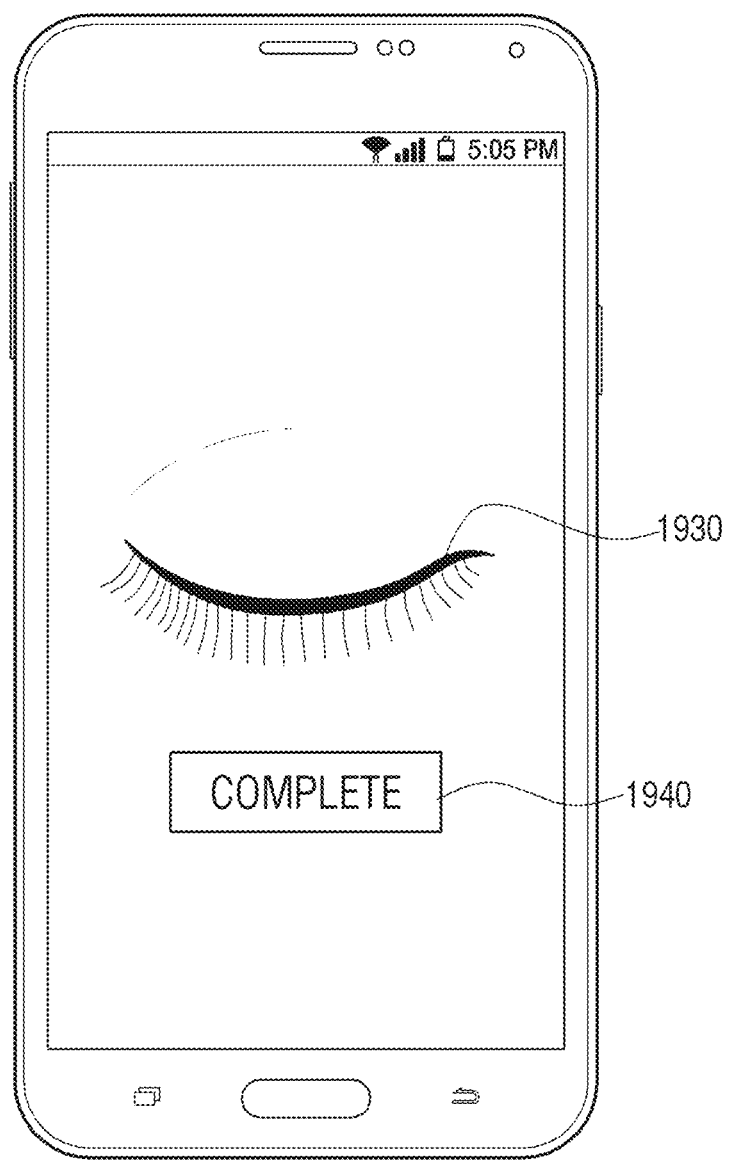

Referring to FIG. 19D, in response to the iris recognition being performed, the controller 270 may control an eye-shaped fixation UI 1930 to close an eye, and control the display 240 to display an iris recognition success message 1940. The iris recognition success message 1940 may be displayed in a visual type. The iris recognition success message 1940 may be represented in an auditory type or a vibration type.

In response to the user terminal apparatus 200 being used by a plurality of persons, the controller 270 may preferentially determine a person who is desired to control the user terminal apparatus 200 and then perform iris recognition.

Figure 20A:
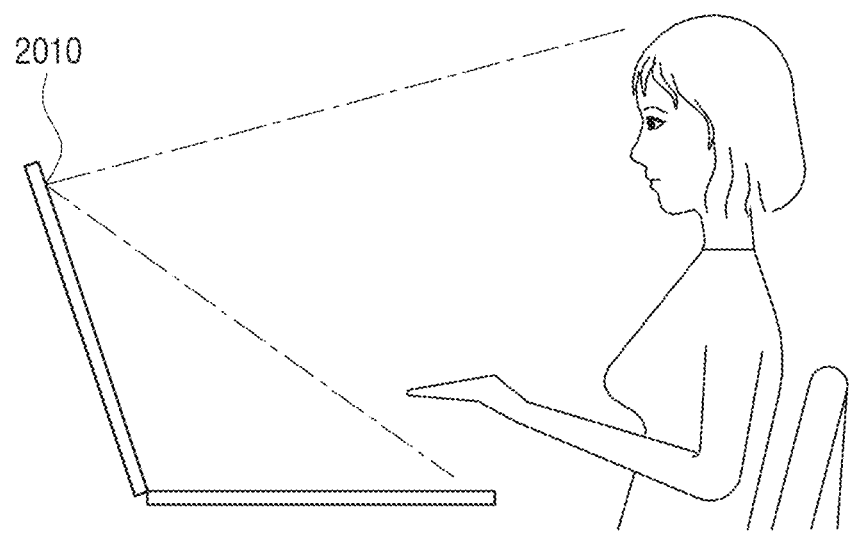

Referring to FIG. 20A, an illustration of a camera 2010 of the user terminal apparatus 200, as illustrated in FIG. 2, is provided, where the camera 2010 is configured to simultaneously recognize an iris and a gesture.

Figure 20B:
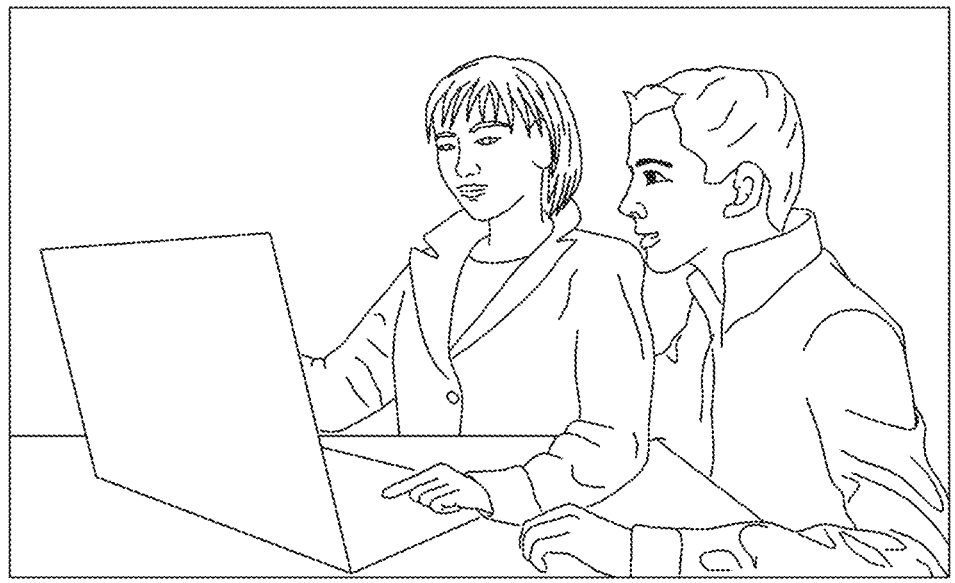

Referring to FIG. 20B, in response to the user terminal apparatus 200, as illustrated in FIG. 2, being used by a plurality of users (for example, in response to a plurality of user simultaneously viewing a movie or a web page), the controller 270, as illustrated in FIG. 2, may preferentially detect face movements of the users and detect a user who stares at a display screen. The controller 270 may give an interaction priority of the user terminal apparatus 200 to the detected user by performing the iris recognition through the above-described various methods.

Figure 21:
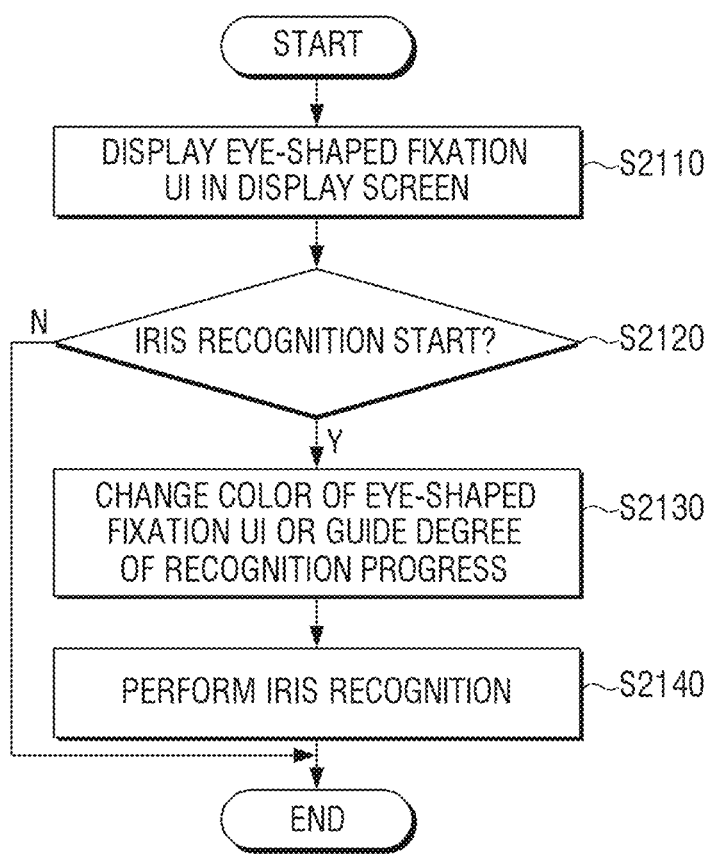

FIG. 21 is a flowchart illustrating an iris recognition method of a user terminal apparatus according to an embodiment of the present disclosure.

Referring to FIG. 21, a flowchart is illustrated, wherein the user terminal apparatus 200, as illustrated in FIG. 2, may display a person's eye-shaped fixation UI in a display screen at operation 52110. The controller 270, as illustrated in FIG. 2, may cause the user to have a staring match by repeatedly opening a person's eye included in the person's eye-shaped fixation UI 1910, as illustrated in FIG. 19A, in wide and narrow configurations.

The user terminal apparatus 200 may determine whether or not to start iris recognition at operation S2120.

In response to the iris recognition being started at operation S2120 the user terminal apparatus 200 may change a color of the eye-shaped fixation UI or display the degree of iris recognition progress to guide that the iris recognition is performing at operation S2130.

The user terminal apparatus 200 may perform the iris recognition at operation S2140.

In response to the iris recognition not being started at operation S2120, the user terminal apparatus 200 may end the iris recognition method.

Figure 22:
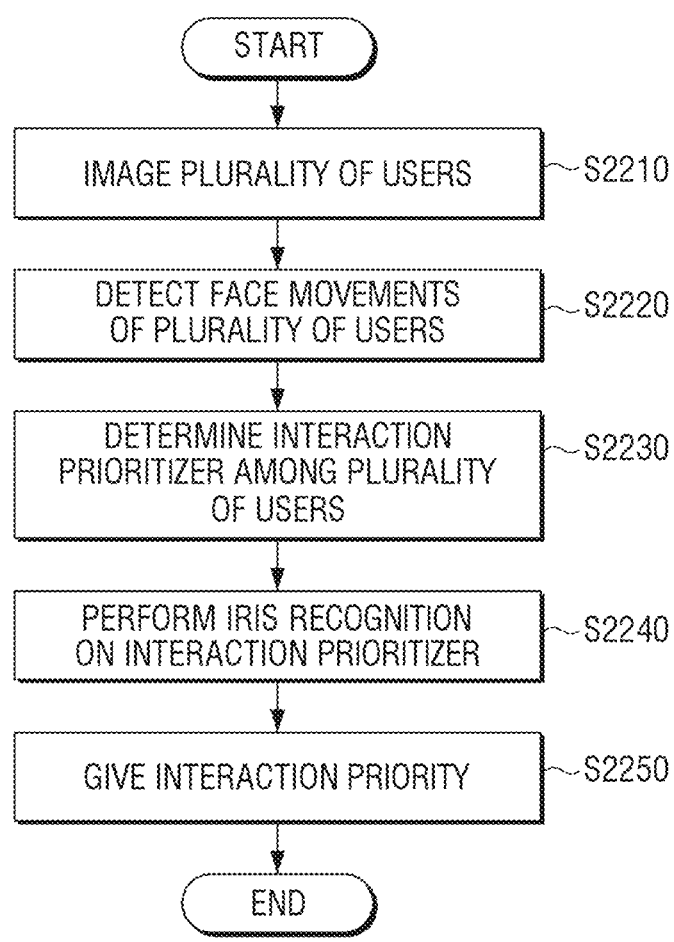

FIG. 22 is a flowchart illustrating an iris recognition method of the user terminal apparatus 200 according to an embodiment of the present disclosure.

Referring to FIG. 22, a flowchart is illustrated, wherein the user terminal apparatus 200, as illustrated in FIG. 2, may image a plurality of users at operation S2210.

The user terminal apparatus 200 may detect face movements of the plurality of users at operation S2220. For example, the user terminal apparatus 200 may determine whether or not directions of the face movements of the plurality of users are directed to the user terminal apparatus 200. In another example, the user terminal apparatus 200 may detect a user located in a front of the user terminal apparatus 200.

The user terminal apparatus 200 may determine an interaction prioritizer of the plurality of users based on a face movement of the detected user at operation S2230. For example, the user terminal apparatus 200 may determine a user who stares at the user terminal apparatus 200.

The user terminal apparatus 200 may perform iris recognition on the interaction prioritizer at operation S2240.

In response to the user authentication succeeding through the performing of the iris recognition, the user terminal apparatus 200 may give an interaction priority to the interaction prioritizer at operation S2250. For example, the user terminal apparatus 200 may neglect voices, motions, and the like input by other users based on voice, a motion, and the like input by the interaction prioritizer other than functions of the user terminal apparatus 200.

According to an embodiment of the present disclosure, the user terminal apparatus 200 may acquire a plurality of reference images according to imaging conditions, and perform the iris recognition using the plurality of acquired reference images. For example, the controller 270, as illustrated in FIG. 2, may acquire the plurality of reference images according to the imaging conditions. The imaging conditions may include at least one among a distance between the user terminal apparatus 200 and the user, resolution, illumination, a focus state, IR light reflection, and the like. In response to the user being imaged to perform the iris recognition, the controller 270 may detect a user eye from the imaged image, and perform the iris recognition by comparing a reference image having an imaging condition corresponding to the detected eye with the user eye.

For example, in response to the plurality of reference images being registered, the controller 270 may convert the plurality of reference images to an iris code, and store the converted iris code in the storage unit 250. However, the controller 270 may store raw data of the plurality of reference images in the storage unit 250, as illustrated in FIG. 2.

In another example, in response to the plurality of reference images being registered, the controller 270 may register and store imaging condition information (for example, distance information) for the user corresponding to the plurality of reference images together with the plurality of reference images. In response to the iris recognition being performed, the controller 270 may acquire the imaging condition information for the user detected through a detector (not shown), and select a reference image for performing the iris recognition among the plurality of reference images based on the acquired imaging condition and the imaging condition information stored in the plurality of reference images. The controller 270 may perform the iris recognition by comparing the selected reference image with the detected user eye.

The controller 270 may acquire the plurality of reference images according to the imaging conditions in response to the plurality of reference images being generated. The controller 270 may acquire the plurality of reference images through image resizing or noise addition. For example, the controller 270 may acquire a first reference image through the imaging unit 220, generate a plurality of reference images according to imaging conditions by performing image resizing or noise addition on the first reference image, and store the plurality of reference images in the storage unit 250.

FIGS. 23 to 29 are diagrams illustrating examples of performing iris recognition using a plurality of reference images according to imaging conditions in a user terminal apparatus according to various embodiments of the present disclosure.

Figure 23:
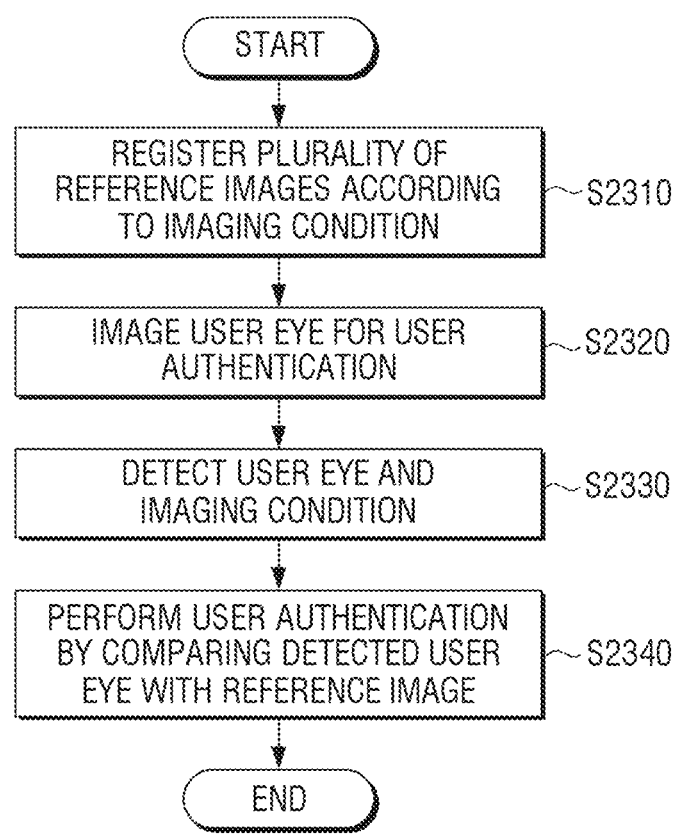
FIGS. 23, 24, 25, 26, 27A, 27B, 28A, 28B, and 29 are diagrams illustrating examples of performing iris recognition using a plurality of reference images according to imaging conditions in a user terminal apparatus according to various embodiments of the present disclosure.

FIG. 23 is a flowchart illustrating a method of performing iris recognition using a plurality of reference images acquired according to an imaging condition according to an embodiment of the present disclosure.

Referring to FIG. 23, a flowchart is illustrated, wherein the user terminal apparatus 200, as illustrated in FIG. 2, may register a plurality of reference images according to an imaging condition at operation S2310. The user terminal apparatus 200 may acquire the plurality of reference images according to an imaging condition. For example, the user terminal apparatus 200 may acquire the plurality of reference images according to a distance between the user terminal apparatus 200 and the user. In another example, the user terminal apparatus 200 may acquire the plurality of reference images according to resolution. In another example, the user terminal apparatus 200 may acquire the plurality of reference images according to surrounding illumination. In another example, the user terminal apparatus 200 may acquire the plurality of reference images according to a focus state. In another example, the user terminal apparatus 200 may acquire the plurality of reference images according to a point in which IR light reflection is caused. In the examples, the user terminal apparatus 200 may register and store imaging condition information and the plurality of reference images corresponding to the imaging condition information. The user terminal apparatus 200 may acquire a plurality of reference images by imaging the plurality of reference images according to the imaging conditions. The user terminal apparatus 200 may generate a plurality of reference images according to an imaging condition through imaging resizing or noise addition on one reference image.

The user terminal apparatus 200 may image a user eye for user authentication at operation S2320.

The user terminal apparatus 200 may detect the user eye from the imaged image, and detect an imaging condition at operation S2330. For example, the user terminal apparatus 200 may detect the user eye (specifically, an iris) by detecting inner and outer boundaries of the iris from the imaged image. The user terminal apparatus 200 may detect the imaging condition (for example, a distance between the user terminal apparatus 200 and the user, and the like). The user terminal apparatus 200 may detect the distance between the user terminal apparatus 200 and user through a distance detector.

The user terminal apparatus 200 may perform user authentication by comparing the detected eye with the reference image at operation S2340. For example, the user terminal apparatus 200 may select a reference image having an imaging condition corresponding to the detected imaging condition among the plurality of reference images. The user terminal apparatus 200 may perform the user authentication by comparing the reference image having the imaging condition corresponding to the detected imaging condition with the detected eye.

As described above, the iris recognition may be performed using the plurality of reference images acquired according to an imaging condition, and thus the accurate iris recognition may be performed more rapidly even in response to the user eye being imaged by various imaging conditions.

Figure 24:
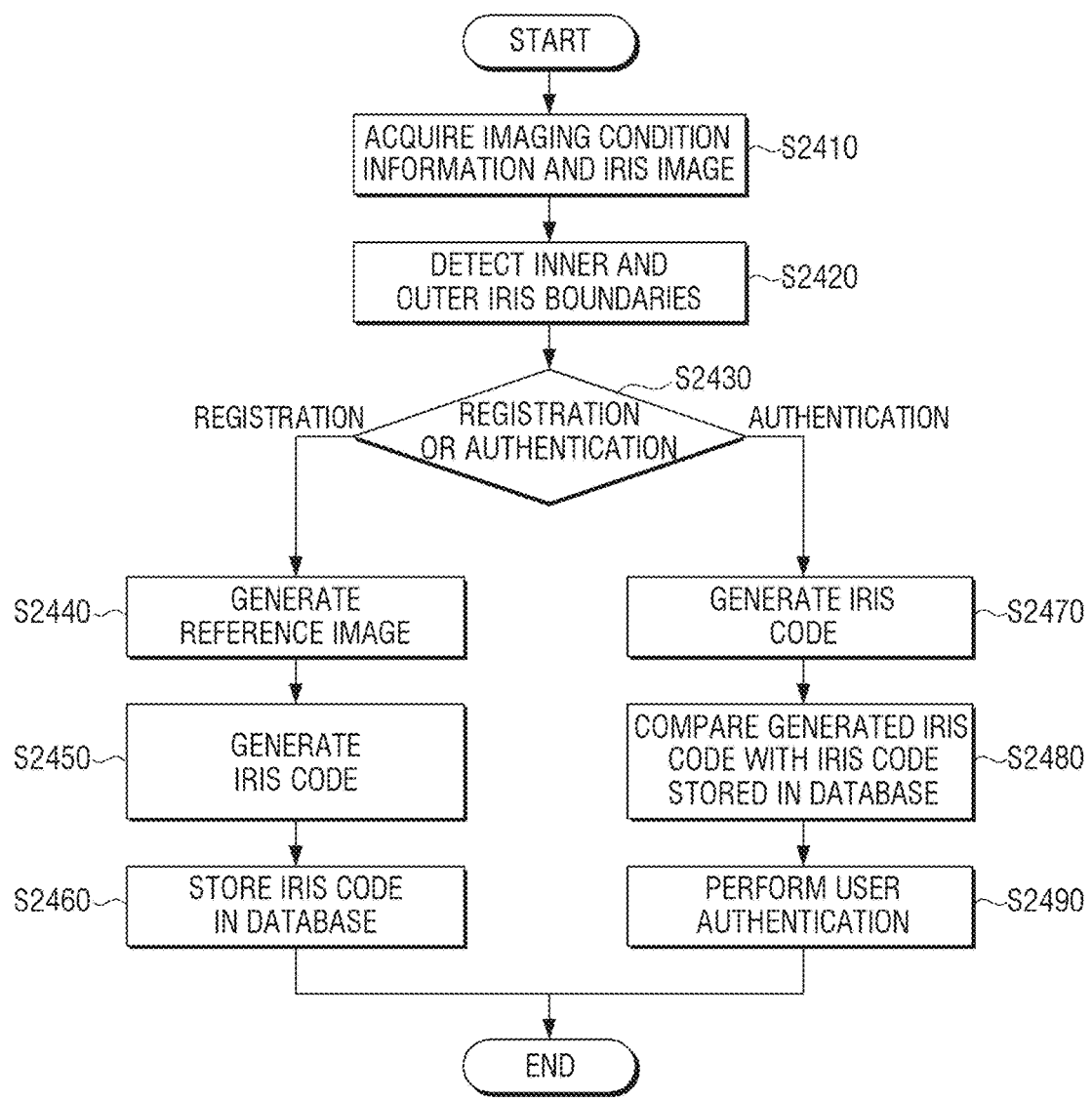

FIG. 24 is a diagram illustrating a method of registering a plurality of images and performing user authentication using the plurality of reference images according to an embodiment of the present disclosure.

Referring to FIG. 24, a flowchart is illustrated, wherein the user terminal apparatus 200, as illustrated in FIG. 2, may acquire imaging condition information and an iris image at operation S2410. For example, the user terminal apparatus 200 may acquire the iris image by imaging an image including the user, and acquire the imaging condition information through various sensors (for example, a distance detection sensor, an illumination sensor, and the like).

The user terminal apparatus 200 may detect inner and outer iris boundaries at operation S2420. That is, the user terminal apparatus 200 may detect a user iris by detecting the inner and outer iris boundaries from the iris image.

The user terminal apparatus 200 may determine whether a current stage is a registration state or an authentication stage at operation S2430.

In response to the current stage being the registration stage, the user terminal apparatus 200 may generate a reference image at operation S2440. For example, the user terminal apparatus 200 may generate the reference image by storing the acquired user iris together with the detected imaging condition information.

The user terminal apparatus 200 may generate an iris code using the reference image at operation S2450. The method of generating the iris code has been already described, and thus detailed description thereof will be omitted.

The user terminal apparatus 200 may store the iris code in a database at operation S2460. That is, the user terminal apparatus 200 may not store the user iris image in the database but may store the iris code in the database.

In response to the current stage being the authentication stage, the user terminal apparatus 200 may generate an iris code at operation S2470. That is, the user terminal apparatus 200 may generate the iris code through the detected user iris.

The user terminal apparatus 200 may compare the iris code stored in the database with the generated iris code at operation S2480. For example, the user terminal apparatus 200 may search for an iris code having an imaging condition information corresponding to the imaging condition information acquired in operation S2410 among the iris codes stored in the database.

In operation S2490, the user terminal apparatus 200 may perform user authentication based on a result of the comparison in operation S2480. For example, in response to similarity being more than or equal to a preset value as the comparison result between the iris code searched in the database and the generated iris code, the user terminal apparatus 200 may perform the user authentication. In response to the similarity being less than the preset value, the user terminal apparatus 200 may output a user authentication fail message.

As illustrated in FIG. 24, the iris code is stored in the reference image registration other than the reference image itself, and thus the operation of converting the reference image to the iris code may not be performed whenever the authentication is performed. The iris code other than the iris image itself may be stored, and thus the user personal information may be protected even in the database being hacked.

Figure 25:
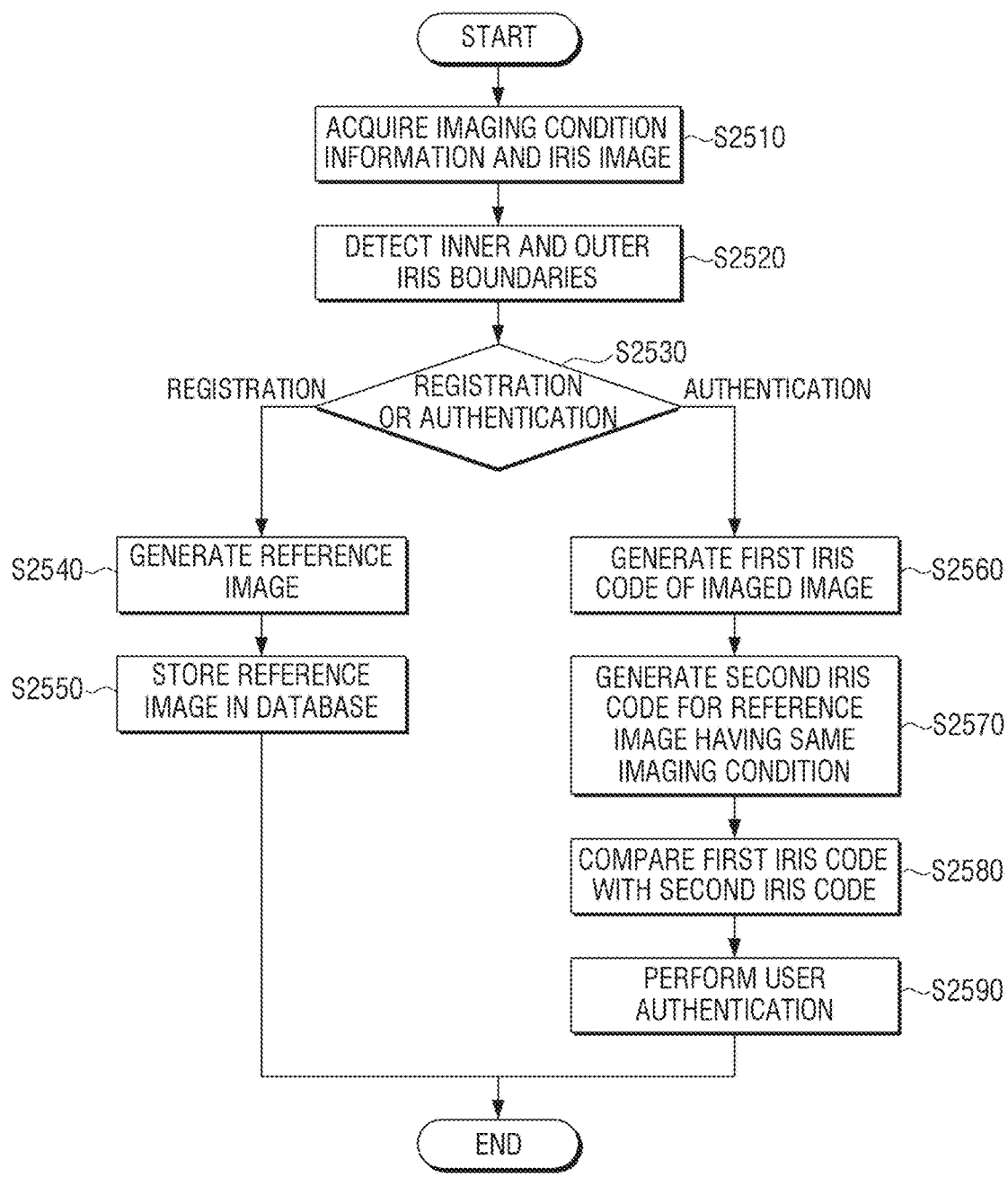

FIG. 25 is a diagram illustrating a method of registering a plurality of images and performing user authentication using the plurality of reference images according to an embodiment of the present disclosure.

Referring to FIG. 25, a flowchart is illustrated, wherein the user terminal apparatus 200, as illustrated in FIG. 2, may acquire imaging condition information and an iris image at operation S2510. For example, the user terminal apparatus 200 may acquire the iris image by imaging an image including the user, and acquire the imaging condition information through various sensors (for example, a distance detection sensor, an illumination sensor, and the like).

The user terminal apparatus 200 may detect inner and outer iris boundaries at operation S2520. That is, the user terminal apparatus 200 may detect a user iris using the inner and outer iris boundaries form the iris image.

The user terminal apparatus 200 may determine whether a current stage is a registration stage or an authentication stage at operation S2530.

In response to the current stage being the registration stage, the user terminal apparatus 200 may generate a reference image at operation S2540. For example, the user terminal apparatus 200 may generate the reference image by storing the acquired user iris together the detected imaging condition information.

The user terminal apparatus 200 may store the generated reference image in the database at operation S2550. That is, the user terminal apparatus 200 may not store the iris code in the database but may store the reference image itself in the database, In response to the current stage being the authentication stage, the user terminal apparatus 200 may generate a first iris code at operation S2560. That is, the user terminal apparatus 200 may generate the first iris code through the detected user iris.

The user terminal apparatus 200 may generate a second iris code for a reference image having the same imaging condition as the detected imaging condition at operation S2570. For example, the user terminal apparatus 200 may search for the reference image having the same imaging condition as the detected reference condition. The user terminal apparatus 200 may generate a second iris code using the searched reference image.

The user terminal apparatus 200 may compare the first iris code with the second iris code at operation S2580.

At operation S2590, the user terminal apparatus 200 may perform user authentication based on a result of the comparison of operation S2580. For example, in response to being determined that similarity being more than or equal to a preset value as the comparison result between the first iris code and the second iris code, the user terminal apparatus 200 may perform the user authentication. In response to being determined that the similarity being less than the preset value, the user terminal apparatus 200 may output a user authentication fail message.

As illustrated in FIG. 25, the reference image itself is registered in the reference image registration, and thus an amount of stored data may be reduced.

A method of generating a plurality of reference images through image resizing on at least one reference image according to an embodiment of the present disclosure, will be described with reference to FIGS. 26 to 28B.

Figure 26:
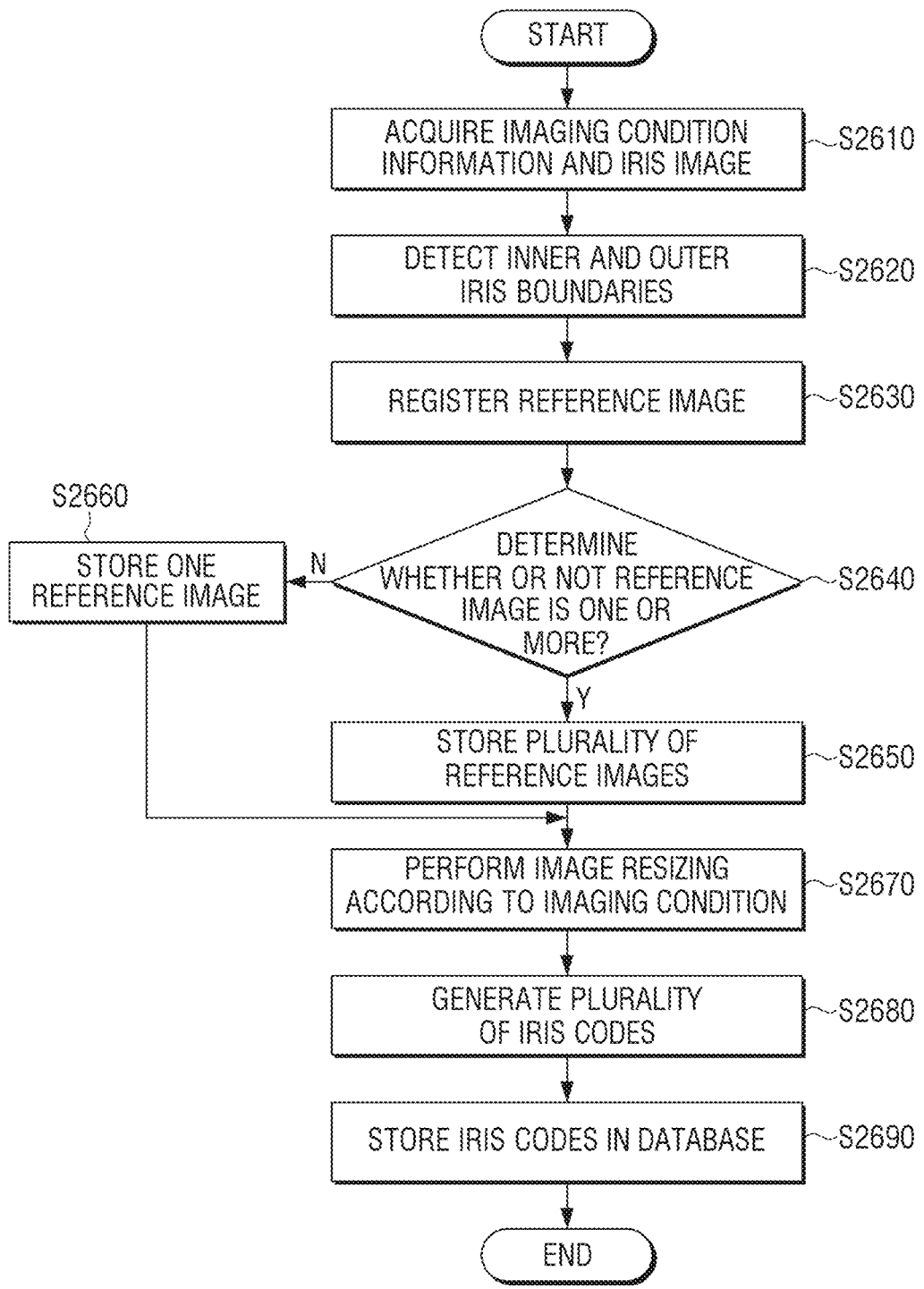

Referring to FIG. 26, a flowchart is illustrated, wherein the user terminal apparatus 200, as illustrated in FIG. 2, may acquire imaging condition information and an iris image at operation S2610.

The user terminal apparatus 200 may detect inner and outer iris boundaries at operation S2620.

The user terminal apparatus 200 may register the detected user iris as a reference image at operation S2630.

The user terminal apparatus 200 may determine whether or not the reference image is one or more at operation S2640.

In response to the reference image being more than one at operation S2640, the user terminal apparatus 200 may store a plurality of reference images at operation S2650.

In response to the reference image being one at operation S2640, the user terminal apparatus 200 may store one reference image at operation S2660.

The user terminal apparatus 200 may perform image resizing according to an imaging condition using the plurality of stored reference images or the stored one reference image at operation S2670.

Figure 27A:
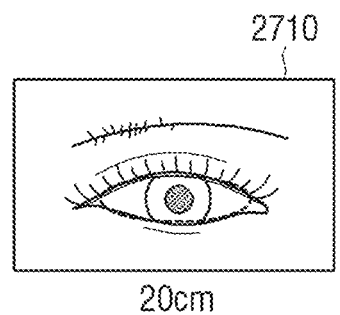
Figure 27B:
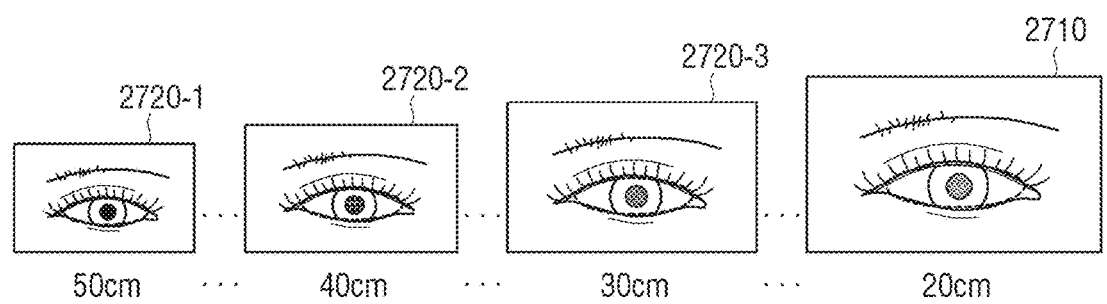

For example, referring to FIGS. 27A and 27B, in response to a first reference image 2710 being acquired in a state in which a distance between the user terminal apparatus 200 and the user is 20 cm, the user terminal apparatus 200 may perform imaging resizing on the first reference image 2710, and acquire a second reference image 2720-1 like an image imaged in the distance between the user terminal apparatus 200 and the user which is 50 cm, a third reference image 2720-2 like an image imaged in the distance between the user terminal apparatus 200 and the user which is 40 cm, and a fourth reference image 2720-3 like an image imaged in the distance between the user terminal apparatus 200 and the user which is 20 cm. The embodiment of the present disclosure has described that the image is resized in units of 10 cm. The image may be resized in certain distance units other than 10 cm (for example, 5 cm and the like).

Figure 28A:
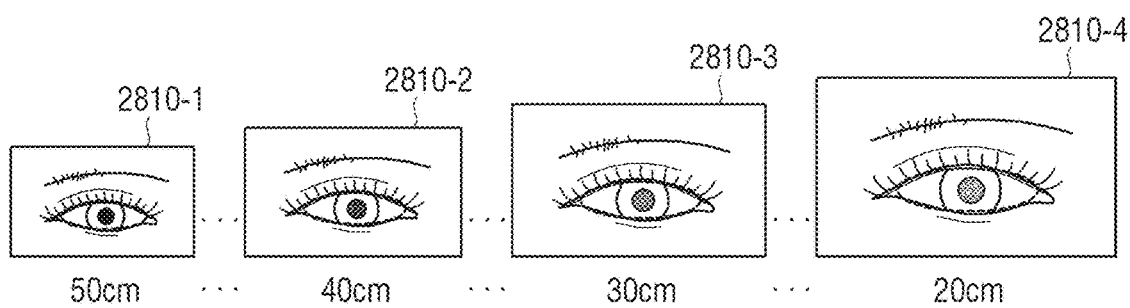
Figure 28B:
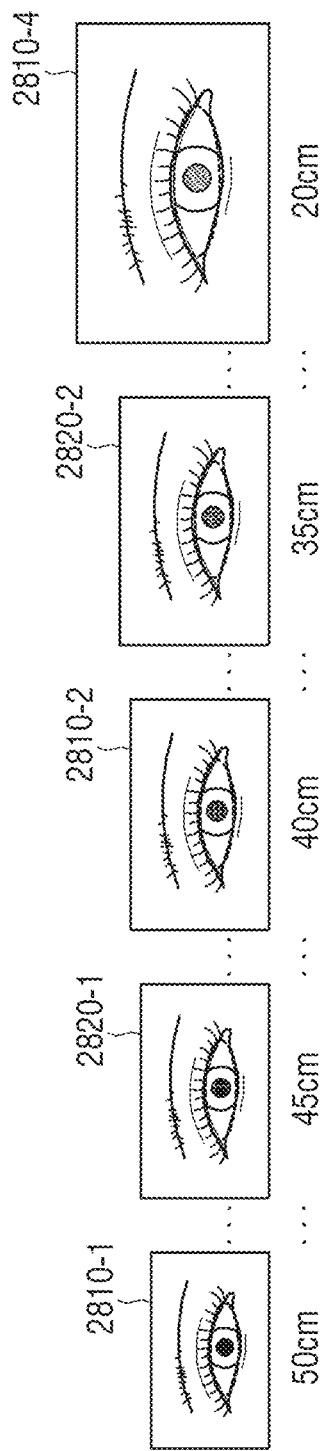

Referring to FIGS. 28A and 28B, in response to first to fourth images 2810-1, 2810-2, 2810-3 and 2810-4 according to a distance between the user terminal apparatus 200 and the user being acquired (e.g., distances 50 cm, 40 cm, 30 cm and 20 cm) the user terminal apparatus 200 may perform resizing on the first reference image 2810-1, and generate a fifth image 2820-1 like an image imaged in the distance between the user terminal apparatus 200 and the user which is 45 cm. Similarly, the user terminal apparatus 200 may perform resizing on the second reference image 2810-2, and generate a sixth image 2820-2 like an image imaged in the distance between the user terminal apparatus 200 and the user which is 35 cm.

The embodiment of the present disclosure has described that the imaging condition is the distance between the user terminal apparatus 200 and the user. The user terminal apparatus 200 may generate a plurality of reference images by performing resizing on an image according to resolution.

Referring back to FIG. 26, the user terminal apparatus 200 may generate a plurality of iris codes using the plurality of generated reference images at operation S2680. Further, the user terminal apparatus 200 may store the generated iris codes in the database at operation S2690.

A method of generating a plurality of reference images through noise addition on at least one reference image according to an embodiment of the present disclosure will be described with reference to FIG. 29

Figure 29:
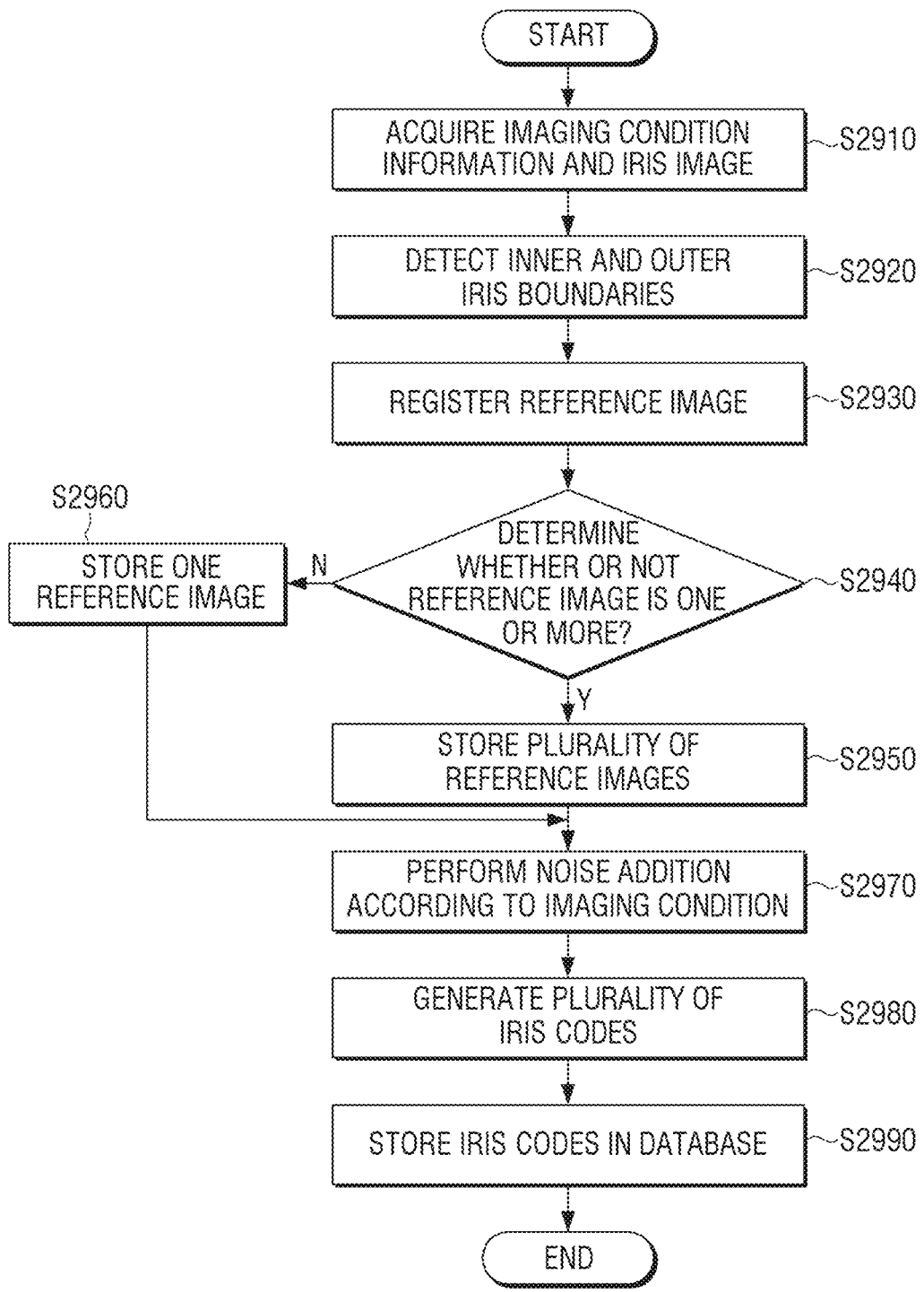

Referring to FIG. 29, a flowchart is illustrated, wherein the user terminal apparatus 200, as illustrated in FIG. 2, may acquire imaging condition information and an iris image at operation S2910.

The user terminal apparatus 200 may detect inner and outer iris boundaries at operation S2920.

The user terminal apparatus may register the detected user iris as a reference image at operation S2930.

The user terminal apparatus 200 may determine whether or not the reference image is one or more at operation S2940.

In response to the reference image being more than one at operation S2940, the user terminal apparatus 200 may store a plurality of reference images at operation S2950.

In response to the reference image being one at operation S2940, the user terminal apparatus 200 may store one reference image at operation S2960.

The user terminal apparatus 200 may perform noise addition according to an imaging condition using the plurality of stored reference images or the stored one reference image at operation S2970. For example, in response to a first reference image being acquired at a first illumination value, the user terminal apparatus 200 may perform noise addition (for example, a brightness adjustment) on the first reference image, and acquire a second reference image like an image imaged at a second illumination value, a third reference image like an image imaged at a third illumination value, and a fourth reference image like an image imaged at a fourth illumination value. In response to the plurality of reference images being acquired, more reference images may also be acquired through the noise addition.

The embodiment of the present disclosure has described that the imaging condition is illumination. The plurality of reference images may be generated through noise addition adding IR light reflection.

The user terminal apparatus 200 may generate a plurality of iris codes using the plurality of generated reference images at operation S2980.

The user terminal apparatus 200 may store the generated iris codes in the database at operation S2990.

As described in FIGS. 26 to 29, the plurality of reference images according to an imaging condition may be acquired through image resizing or noise addition, and thus more accurate iris recognition may be possible even in response to a small number of iris registration times being performed.

The apparatuses according to the various embodiments of the present disclosure, may include a processor, a memory configured to store and execute program data, a permanent storage such as disk drive, a communication port which communicates with an external apparatus, a UI apparatus such as a touch panel, a key, a button, and the like. The methods implemented with software modules or algorithms may be stored in a non-transitory computer-readable recording medium as computer-readable codes or program commands executable on the processor. The non-transitory computer-readable recording medium may include a magnetic storage medium (for example, a ROM, a RAM, a floppy disc, a hard disk, and the like) and an optical readable medium (a compact disc (CD), a digital versatile disc (DVD), and the like). The non-transitory computer readable medium is distributed in computer systems coupled through a network, and the computer-readable code is stored and executed in a distributed manner. The medium may be readable by the computer, stored in a memory, and executed by a processor.

The various embodiments of the present disclosure may be implemented with functional block configurations and various processing operations. The functional blocks may be implemented with various hardware and/or software configurations. For example, various embodiments of the present disclosure may employ direct circuit configurations such as a memory, processing, logic, and a look-up table which may execute various functions through control of one or more microprocessors or other control apparatuses. In a similar manner that the configuration components may be executed by software programming or software elements, various embodiments of the present disclosure may be implemented with a programming language or a scripting language such as C, C++, Java, or assembler including various algorithms implemented with a data stricture, processes, routines, and a combination of other programming configurations. The functional aspects may be implemented with algorithms executed in one or more processors. For electronic environment setup, signal processing, and/or data processing, and the like, various embodiments of the present disclosure may employ the related art. The terms such as "mechanism", "element", "unit" and "configuration" may be widely used, and are not limited to mechanical and physical configurations. The terms may refer to a series of routines of software in conjunction with a processor and the like.

Specific executions described in various embodiments of the present disclosure are illustrative, and may limit technical scope even in any method. For clarity, description for electronic configurations, control systems, and software in the related art and other functional aspects of the systems may be omitted. Coupling or coupling members of lines between components illustrated in the drawings exemplarily illustrate functional coupling and/or physical or circuital coupling, and may be represented with various functional couplings, physical couplings, or circuital coupling replaceable or addable in actual apparatuses.

In the description (specifically, in the claims), the term "said" and an instruction term similar thereto may include a singular form and a plural form. The range described herein may include an individual value included in the range (unless the context clearly indicates otherwise), and it is intended to describe the individual value constituting the range in the description. Unless the order for operations constituting the method are clearly described, or otherwise defined, the operations may be performed in suitable order. This is not limited to the description order of the operations.

Various aspects of the present disclosure can also be embodied as computer readable code on a non-transitory computer readable recording medium. A non-transitory computer readable recording medium is any data storage device that can store data which can be thereafter read by a computer system. Examples of the non-transitory computer readable recording medium include Read-Only Memory (ROM), Random-Access Memory (RAM), CD-ROMs, magnetic tapes, floppy disks, and optical data storage devices. The non-transitory computer readable recording medium can also be distributed over network coupled computer systems so that the computer readable code is stored and executed in a distributed fashion. Also, functional programs, code, and code segments for accomplishing the present disclosure can be easily construed by programmers skilled in the art to which the present disclosure pertains.

At this point it should be noted that various embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the various embodiments of the present disclosure as described above. Alternatively, one or more processors operating in accordance with stored instructions may implement the functions associated with the various embodiments of the present disclosure as described above. If such is the case, it is within the scope of the present disclosure that such instructions may be stored on one or more non-transitory processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A user terminal apparatus comprising:
a camera;
a display;
at least one processor; and
at least one memory configured to store one or more computer programs configured to be executed by the at least one processor, the one or more computer programs including instructions for the at least one processor to:
generate an image of a user by capturing the user using the camera,
control the display to display the image of the user,
detect an eye of the user from the image of the user,
control the display to display a guide image in a position of the image of the user in which the detected eye of the user is located, and
in response to a difference between a size of an iris included in the detected eye of the user and a size of the guide image being within a preset range, perform iris recognition,
wherein the guide image comprises an eye guide image and an iris guide image, the eye guide image comprising a shape that corresponds to the eye of the user and the iris guide image comprising a shape that corresponds to the iris of the user.

2. The user terminal apparatus of claim 1, wherein the eye guide image and the iris guide image have statistic sizes of the eye of the user and the iris of the user, respectively, in response to the user being located in a position matching with a focal length of the camera.

3. The user terminal apparatus of claim 2, wherein the guide image further comprises an iris line of the user actually detected.

* * * * *